United States Patent [19]

Ansell et al.

[11] Patent Number: 4,858,223
[45] Date of Patent: Aug. 15, 1989

[54] SECURITY ARRANGEMENT FOR A TELECOMMUNICATIONS EXCHANGE SYSTEM

[75] Inventors: John W. Ansell, Poole; Geoffrey Chopping, Wimborne Minster; Richard N. Waters, Bournemouth, all of England

[73] Assignee: The Plessey Company plc, Ilford, England

[21] Appl. No.: 170,384

[22] PCT Filed: Jul. 22, 1987

[86] PCT No.: PCT/GB87/00525
§ 371 Date: May 20, 1988
§ 102(e) Date: May 20, 1988

[87] PCT Pub. No.: WO88/00786
PCT Pub. Date: Jan. 28, 1988

[30] Foreign Application Priority Data

Jul. 24, 1986 [GB] United Kingdom ............... 8618100

[51] Int. Cl.$^4$ ............................................. H24J 1/16
[52] U.S. Cl. .................................................. 370/14
[58] Field of Search ................ 370/13, 14, 16, 58; 379/16

[56] References Cited

U.S. PATENT DOCUMENTS

| | | |
|---|---|---|
| 4,424,421 | 1/1984 | Townsend et al. .................. 370/14 |
| 4,500,985 | 2/1985 | Chang ................................ 370/14 |
| 4,764,918 | 8/1988 | Waters .............................. 370/14 |

Primary Examiner—Douglas W. Olms
Assistant Examiner—Frank M. Scutch, III
Attorney, Agent, or Firm—Fleit, Jacobson, Cohn, Price, Holman & Stern

[57] ABSTRACT

A security arrangement for a telecommunications system having two security planes, a plurality of peripherals, a plurality of peripheral communication controllers; and switching arrangements interconnecting the peripheral communication controllers. To determine a faulty security plane, a duplex path is provided between the controllers, and, using this path, a controller automatically performs path checks on one of the security planes. If the plane is found to be not faulty, the controller sends data associated with that plane to the peripheral with which it is in communication.

6 Claims, 38 Drawing Sheets

SECURITY ARRANGEMENT FOR A TELECOMMUNICATIONS EXCHANGE SYSTEM

BACKGROUND OF THE INVENTION

The present invention relates to a security arrangement for a telecommunications exchange system employing switching networks which handle time division multiplexed information.

Switching networks which handle time division multiplexed information "make" and "break" the communication paths in synchronism with the appearance of the multiplexed information. Typically a time division switching network suitable for handling pulse code modulated speech samples includes (i) a receive equipment including a receive sample store for the incoming path of each time division multiplex junction, (ii) a transmit equipment including a transmit sample store for the outgoing path of each time division multiplex junction and (iii) an electronic switching network providing sample information transfer paths between the various channel storage locations of the receive sample stores and the various channel storage locations of the transmit sample stores. Each sample store comprises a plurality of sample information storage locations. On the incoming or receive side of the exchange the successive channels of the received t.d.m. transmission are sequentially fed into successive storage locations of the appropriate receive sample store; whereas on the outgoing or transmit side of the exchange the channel storage locations of each transmit sample store are successively fed on to the outgoing path of the associated junction.

Such exchange systems require security arrangements and find application in the "SYSTEM X" type of telecommunications exchanges in which line concentrators and digital route switching are provided, including a peripheral card controller. Exchanges of this type are provided with two security planes. The main fault detection mechanism used for speech within the peripheral card controller is a discrepancy detector which compares the data, on a per time slot basis, from both security planes and indicates a fault when not equal. This is a good mechanism for fault detection but does not indicate which security plane is faulty. As only eight bits will be switched through the switch, no check code can be used to determine the faulty plane. In normal operation, Plane 0 data will always be chosen.

Accordingly an aim of the present invention is to provide a security arrangement in which the faulty security plane is determined by the use of path check equipment which executes a path check algorithm.

SUMMARY OF THE INVENTION

According to the present invention, there is provided a security arrangement for a telecommunications system having two security planes, a plurality of peripheral card controllers, a plurality of peripherals; and switching arrangements interconnecting the peripheral card controllers, wherein, to determine a faulty security plane a path is provided between the controllers, and, using this path, a controller automatically performs path checks on one of the security planes, and if found to be not faulty, the controller sends data associated with that plane to the peripheral with which it is in communication.

According to an aspect of the present invention the path checks are performed by the controller transmitting path check patterns to the switching arrangement for all timeslots for which a discrepancy is detected.

According to a further aspect of the invention, the controller is arranged to monitor data received from the switching arrangement looking for the path check patterns being returned from a controller at the other end of the path which will be similarly performing a path checking operation.

BRIEF DESCRIPTION OF THE DRAWING

An embodiment of the present invention will now be described with reference to the following drawings wherein:

FIG. 1a is placed to right of FIG. 1, FIG. 6a is placed below FIG. 6, and FIG. 6b is placed to the right of FIG. 6a, FIGS. 7 and 7a show a flow diagram of a Peripheral Data routine, when FIG. 9a is placed to the right of FIG. 9, FIG. 19a is placed to the right of FIG. 19, and FIG. 19b is placed below FIG. 19, and FIG. 19c is placed below FIG. 19a, FIG. 20 shows a flow diagram of a Looking for Pattern 1 routine, FIG. 22a is placed to the right of FIG. 22, FIG. 24a is placed below FIG. 24, FIG. 26a is placed to the right of FIG. 26, and, FIG. 27 shows a flow diagram of a Path Check Bias routine.

DETAILED DESCRIPTION OF PREFERRED EMBODIMENT

Figure 1:
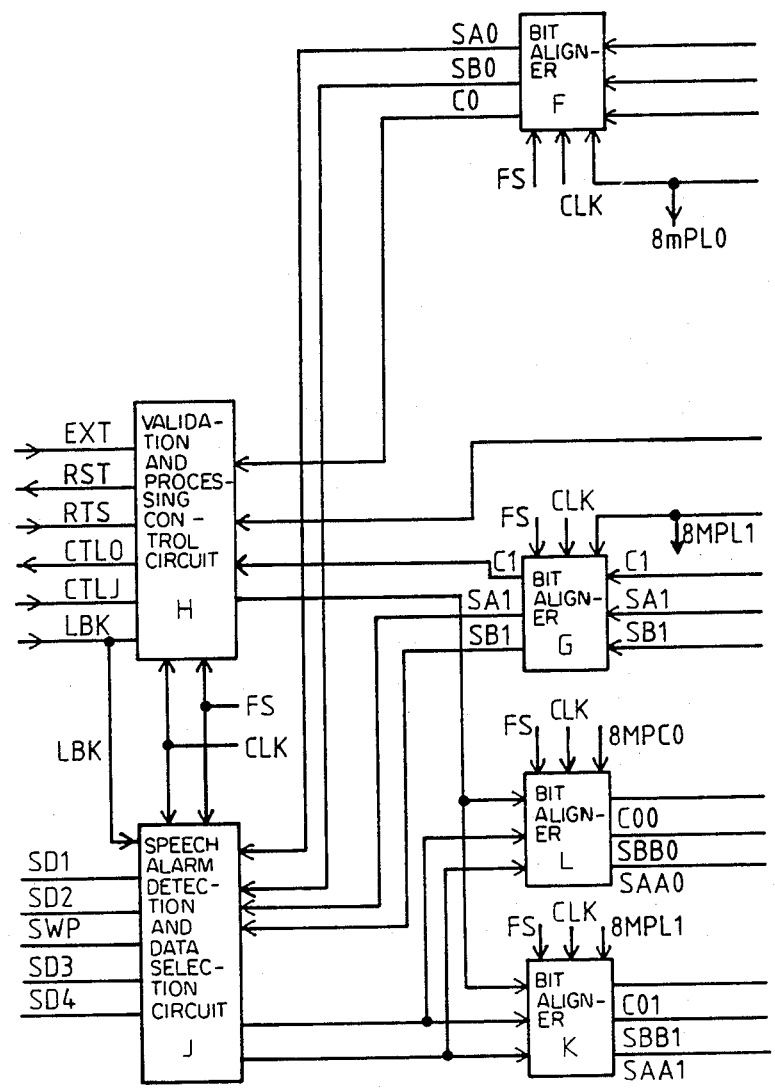
FIGS. 1 and 1a show a block diagram of a peripheral card controller, when
Figure 1A:
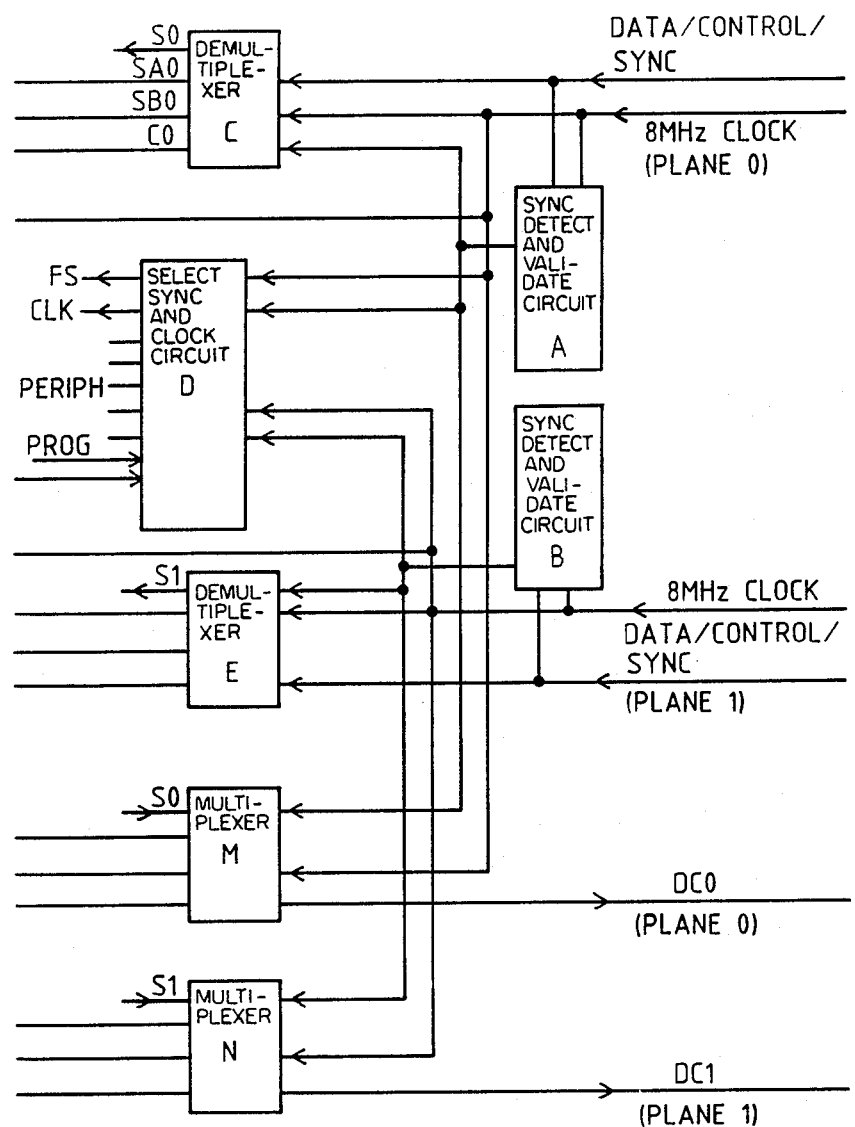

Referring to FIGS. 1 and 1a, a functional block diagram is shown of a peripheral card controller.

Sync Detect and Validate Circuit (A)

This circuit receives data, control and sync information together with an 8MHz clock signal in respect of security Plane 0. The circuit detects and validates the sync information and generates a sync data signal for demultiplexer C, select sync and clock circuit D and multiplexer M.

Sync Detect and Validate Circuit (B)

This circuit receives data, control and sync information together with an 8MHz clock signal in respect of security Plane 1. The circuit detects and validates the sync information and generates a sync data signal for select sync and clock circuit D, demultiplexer E, and multiplexer N.

Demultiplexer (C)

This circuit demultiplexes the data, control and sync information in respect of Plane 0, under the control of circuit A, and generates a control signal C0, a speech signal SA0, a speech signal SB0 and a sync signal S0.

Select Sync and Clock Circuit (D)

This circuit receives the 8MHz clock signal from Plane 0 and Plane 1, the signals generated by circuits (A) and (B), and a program signal, PROG. The circuit generates in accordance with the received signals various clock and enable signals CLK, FS for presentation to circuits (F,G,H,J,K,L), and generates signals for, and receives signals from peripheral equipment PERIPH.

Demultiplexer (E)

This circuit demultiplexes the data control and sync information in respect of Plane 1, under the control of circuit B, and generates a control signal C1, a speech signal SA1, a speech signal SB1 and a sync signal S1.

Bit Aligners (F and G)

These circuits re-time the signals SA0, SB0, C0 and SA1, SB1, C1 respectively under the control of signals CLK and FS, generated by circuit D. Signals SA0, SB0, SA1, SB1 are then presented to the speech alarm detection and data selection circuit J, and signals C0, C1 are presented to the control validation and processing circuit H.

Control Validation and Processing Circuit (H)

This circuit generates control signals for presentation to the bit aligners L and K, and a reset RST signal and a control signal, CTL0 for external equipment. The circuit receives signals C0 and C1 from bit-aligners F and G, and a sync signal from circuit D. The circuit also receives an external alarm signal EXT, a request to sent signal RTS, a control signal CLTI and a peripheral loopback signal LBK from external equipment.

Speech Alarm Detection and Data Selection Circuit (J)

This circuit determines the conditions which permit speech data received from bit aligners F and G to be despatched on lines SD1 and SD2. It also determines the condition which permit the speech data received on lines SD3, SD4 to be despatched by way of bit aligners L and K. The circuit is controlled by a swop signal SWP, received from external equipment and by the peripheral loopback signal LBK received from circuit H.

Bit Aligners (L and K)

These circuits re-time the signals received from circuit J in accordance with signals FS and CLK from circuit D. The circuits are controlled by the control signals from circuit H. Bit aligner L handles data in respect of Plane 0 and generates speech signals SAA0, SBB0 and a control signal CO0, and bit aligner K handles data in respect of Plane 1 and generates speech signals SAA1, SBB1 and sync signal CO1.

Multiplexer (M)

This circuit multiplexes the speech signals SBB0, SAA0 in respect of Plane 0, and generates a multiplexed output data control signal on line DC0. The multiplexer is controlled by control signal CO0, sync signal S0 and a sync detect signal from circuit A.

Multiplexer (N)

This circuit multiplexes the speech signals SAA1, SBB1 in respect of Plane 1, and generates a multiplexed output data control signal on line DC1. The multiplexer is controlled by control signal CO1, sync signal S1, and a sync detect signal from circuit B.

When a single fault occurs discrepant data may be received by a peripheral card controller in several time slots. It is assumed that simultaneous faults do not occur in both security planes at the same time and that any previous faults, that have not yet been repaired, have been isolated by the use of locking and idle patterns. Consequently only one equipment failure at a time needs to be catered for by the path checking algorithm. Therefore if it can be determined which plane has the faulty equipment and which time slots are receiving corrupted data from the faulty equipment, then it is possible to accurately select uncorrupted data.

To determine a faulty security plane the peripheral card controller relies on a duplex path through the switch to another peripheral card controller. Using this path it performs path checks on security Plane 1. If the path checks succeed the peripheral card controller sends Plane 1 data to the peripheral. If the path checks fail, the peripheral card controller sends Plane 0 data to the peripheral. The peripheral card controller reports the results of the path checks to a control system. The path checks are performed by the peripheral card controller transmitting path check patterns to the switch for all timeslots on which it detects discrepancy. The peripheral card controller monitors the data received from the switch looking for the path check patterns being returned from the peripheral card controller at the other end of the duplex path which will have seen discrepant data and will similarly be path checking. If the patterns are received from the switch, plane 1 is considered good. If the patterns are not received within a two Multiframe timeout, plane 1 is considered bad.

Two patterns are used for performing path check. These are:

Bit 0 1 2 3 4 5 6 7

Pattern 0=1 0 1 1 0 1 1 0
Pattern 1=0 1 0 0 1 0 0 1

The path check patterns that are transmitted into the switch will be alternated each frame from the commencement of path checking and synchronised by a two frame sync signal derived from the sync stream. Path checking is synchronised across all peripheral card controllers via the Multiframe sync. The path check algorithm relies on the state describing the condition of the peripheral card controller as a whole and on the state describing the condition of a speech timeslot performed for each of the 64 timeslots received by the peripheral card controller.

The peripheral card controller will be in one of six possible states:
Checking for Discrepancy.
Persisting Discrepancy.
Looking For Pattern 0.
Looking For Pattern 1.
Path Check Continue.
Path Check Complete.

Each speech timeslot is in one of two possible states:
(a) No fault, Path Checking Off For each timeslot in the 'no fault' state the peripheral card controller performs a discrepancy check on the data received from the switch. If a discrepancy is detected, the 'Path Checking On' state is entered for that timeslot.

(b) Fault, Path Checking On

Figure 2:
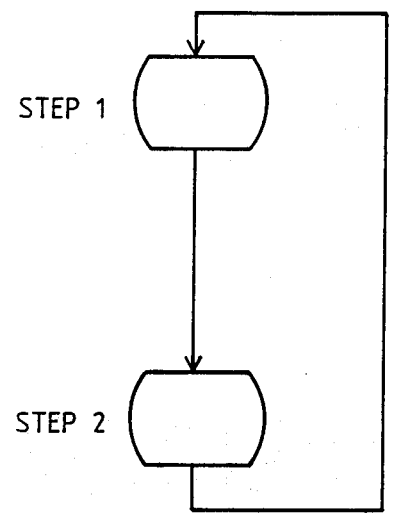
FIG. 2 shows a flow diagram of Timeslot Transitions.

If the peripheral card controller is path checking, that is, if the peripheral card controller is either in the Looking for Pattern 0, Looking for Pattern 1 or Path Check Continue state, then the peripheral card controller will perform path checks for this timeslot. A timeslot being path checked will transmit path check patterns into the switch on Plane 1. If the peripheral card controller state returns to 'checking for discrepancy', all timeslot states will enter the no fault, Path Checking Off state. The timeslot state transistions are shown in FIG. 2.

Step 1. This step checks for a discrepancy, Path Check patterns will not be transmitted for timeslots in this state.

Step 2. If the peripheral card controller is path checking then Path Check patterns will be transmitted for timeslots in this state. A reset alarm will return all timeslots to Step 1.

The speech discrepancy algorithm of the peripheral card controller has the following six states:

Checking for Discrepancy

The peripheral card controller is performing discrepancy check on the data being received from the switch. The peripheral card controler enters the 'persisting discrepancy' state when a discrepancy is detected. A speech fault register is updated to contain the current timeslot number and fault state 'Looking for Pattern 0'.

Persisting Discrepancy

The peripheral card controller is persisting the discrepancy detected. If the discrepancy persists, the peripheral card controller will, at the end of a Multiframe, enter the 'Looking For Pattern 0' state and a two Multiframe Timeout will commence. If the discrepancy does not persist, the peripheral card controller will, at the end of a Multiframe, return to the 'checking for discrepancy' state. The persistance algorithm counts the number of discrepant frames within a Multiframe time interval. If 'm' faulty frames are detected, where 'm' is held in a register, where 0 is less than m, which is less than 5, in a Multiframe, the discrepancy will be persisted.

Looking for Pattern 0

The peripheral card controller looks for Pattern 0 occurring in any of the 64 Timeslots. The first timeslot to provide Pattern 0 will be noted in the speech fault register, and the fault state updated to 'Looking For Pattern 1'. For the rest of the algorithm the peripheral card controller will only concern itself with this one timeslot. When Pattern 0 is found, the peripheral card controller enters the 'Looking For Pattern 1' state.

Looking for Pattern 1

The peripheral card controller will remain in this state for one frame. Path check pattern 0 has been detected and the peripheral card controller is now checking for path check pattern 1. If pattern 1 is received in the timeslot whose number is held in the speech fault register, the peripheral card controller state will change to the 'Path Check Continue' state and the Fault state of the register will be updated to 'Path Check Continue'. If pattern 1 is not received, in the timeslot whose number is held in the speech fault register, the peripheral card controller will return to the 'Looking for path check pattern 0' state but still concerning itself with the one timeslot, that is, it will look for Pattern 0 occurring in the timeslot whose number is held in the speech fault register.

Path Checking Continue

The path checks have been completed successfully for the timeslot in question. The peripheral card controller will continue to transmit test patterns into the switch until the peripheral card controller state changes to 'Path Checking Complete'.

Path Checking Complete

The peripheral card controller will go to 'Path Check Complete' upon completion of the two Multiframe timeout, which started when the peripheral card controller first went to 'Looking For Pattern 0'. A peripheral card controller in the 'Path Checking Complete' state has completed its path check sequences. The fault state of the switch can now be determined by reading the speech fault register. The faulty timeslot number will indicate the timeslot that was tested for Path Check Patterns. The fault type number usually indicates which plane of the switch is faulty as follows:

Looking for path check pattern 0—Plane 1 faulty.
Looking for path check pattern 1—Plane 1 faulty.
Path Check Complete—Plane 0 faulty.

Figure 3:
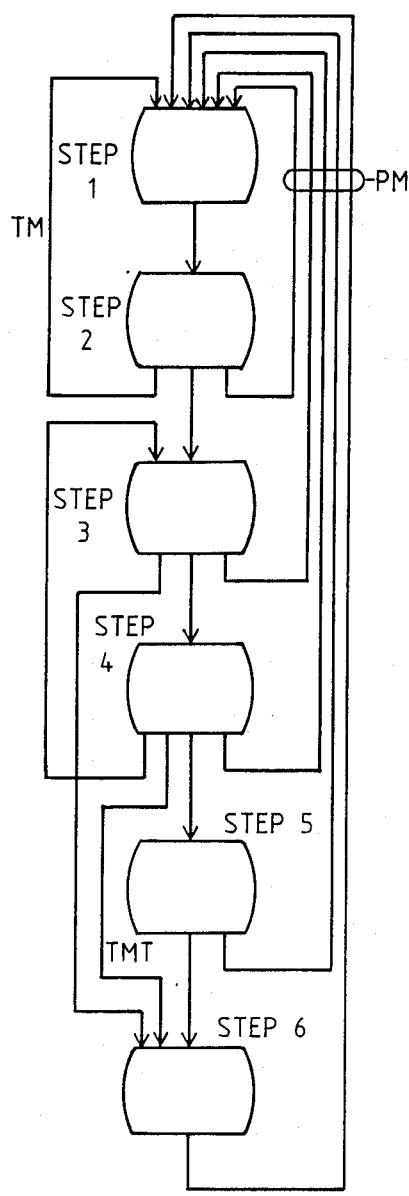
FIG. 3 shows a flow diagram of Peripheral card Controller Transitions.

The algorithm now has sufficient information to ensure that good data is sent to the peripheral. The peripheral card controller will normally send a 'request to send alarm' to the control system when the peripheral card controller enters the 'Path Checking Complete' state. If the peripheral card controller receives a 'reset alarms' command from the control system, all speech timeslot states are set to 'no fault', Path Checking Off, the peripheral card controller state is set to 'checking for discrepancy' and the 'request to send alarm' flag is reset. The peripheral state transistions are shown in FIG. 3.

STEP 1. This step performs a discrepancy checking operation. If a discrepancy is found step 2 is performed.

STEP 2. This step checks to see if the discrepancy is persisting. If a discrepancy persists step 3 is performed. If after sixteen frames the discrepancy has not persisted then a time-out TM occurs and step 1 is repeated.

STEP 3. This step looks for pattern 0. If pattern 0 is found step 4 is performed. If pattern 0 is not found then the occurrance of the thirty-two frame timeout TMT will cause step 6 to be performed.

STEP 4. This step looks for pattern 1. If pattern 1 is found, step 5 is performed. If pattern 1 is not found step 3 is repeated. After thirty two frames, a time-out TMT occurs and step 6 is performed.

STEP 5. This step continues the path check bus biases to Plane 1. After thirty-two frames a time-out TMT occurs and step 6 is performed.

STEP 6. This step is performed when the path check is complete.

During Steps 2-6, a processor message PM will cause step 1 to be repeated.

Figure 4:
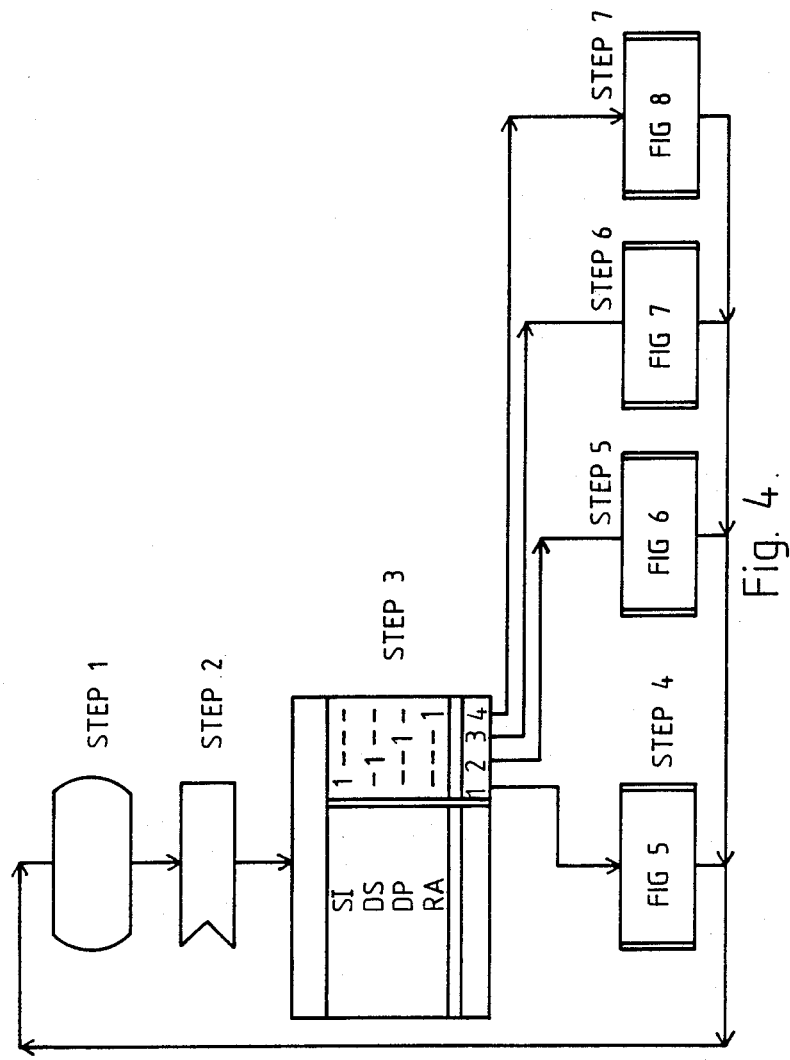
FIG. 4 shows a flow diagram of an Input Loop routine.

FIG. 4 shows the Input Loop routine.

STEP 1. This step performs an input waiting operation.

STEP 2. This step acknowledges when an input has been received.

STEP 3. This step determines which input routine is received as follows:
Sync Input SI, in which case step 4 is performed,
Data from Switch DS, in which case step 5 is performed,
Data from a Peripheral, DP, in which case step 6 is performed, or,
Reset Alarms, RA, in which case step 7 is performed.

Figure 5:
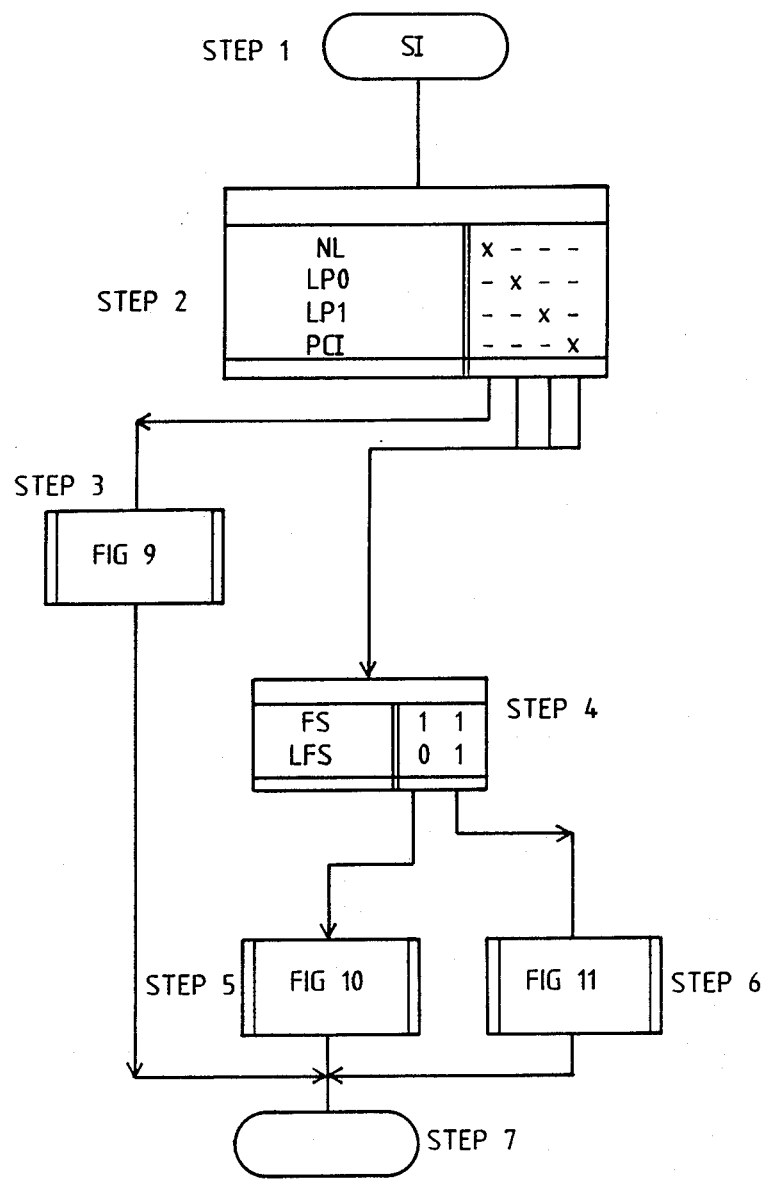
FIG. 5 shows a flow diagram of a Sync Input routine.

STEP 4. This step is a Sync Input routine and is shown in FIG. 5.

Figure 6:
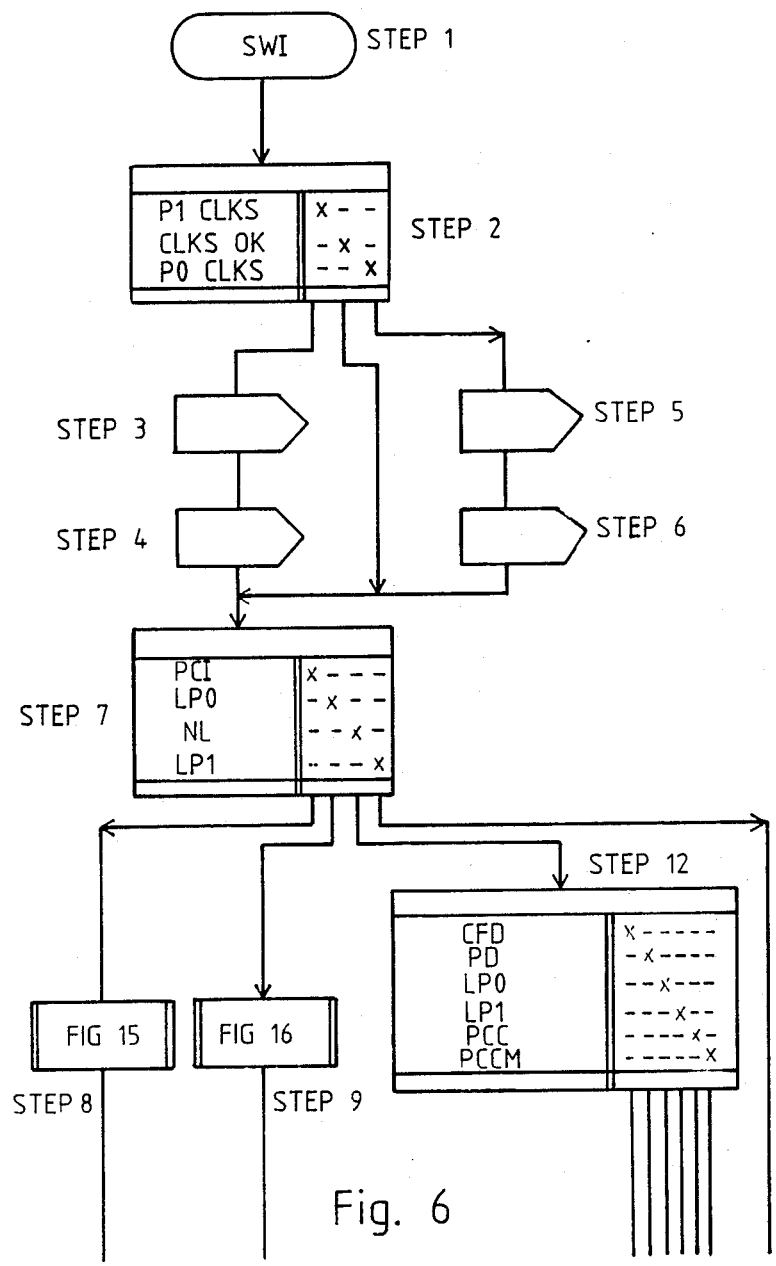
FIGS. 6, 6a and 6b show a flow diagram of a Switch Input routine, when

STEP 5. This step is a Switch Input routine and is shown in FIG. 6.

Figure 7:
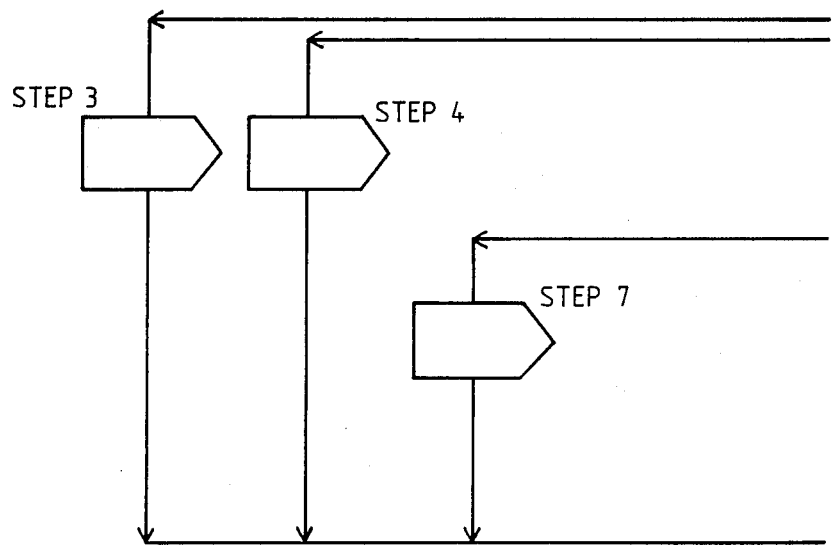
FIG. 7a is placed to the right of FIG. 7.

STEP 6. This step is a Peripheral Input routine and is shown in FIG. 7.

Figure 8:
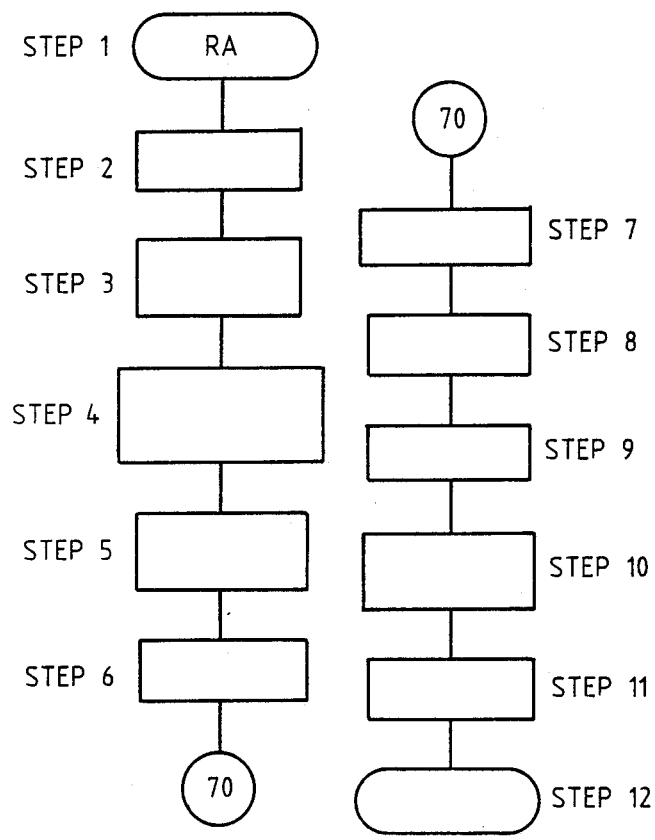
FIG. 8 shows a flow diagram of a Reset Alarm routine.

STEP 7. This step is a Reset Alarm routine and is shown in FIG. 8.

FIG. 5 shows the Sync Input routine, SI.

STEP 1. This step enters the Sync Input routine.

STEP 2. This step determines the lock state of the switch as follows:
No Lock NL, in which case step 3 is performed.
Lock Plane 0 LP0, in which case step 4 is performed.
Lock Plane 1 LP1, in which case step 4 is performed.
Path Check inhibited PLI in which case step 4 is performed.

STEP 3. This step performs the Sync Function as described with reference to FIG. 9.

STEP 4. This step determines the input state of the frame sync FS and low frequency sync LFS. When the states are 1,0 respectively step 5 is performed, and when the states are 1,1, step 6 is performed.

STEP 5. This step performs an Inhibit Check Persist 1 routine and is described with reference to FIG. 10.

STEP 6. This step performs an Inhibit Check Persist 2 routine and is described with reference to FIG. 11.

STEP 7. This step exits the Sync Input routine.

Figure 6A:
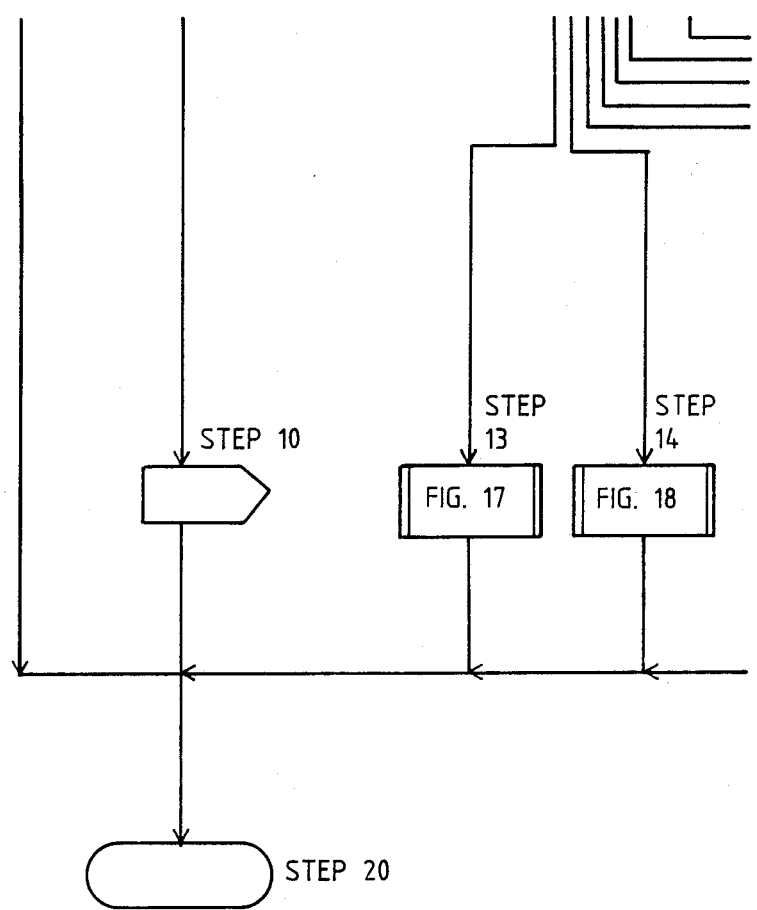
Figure 6B:
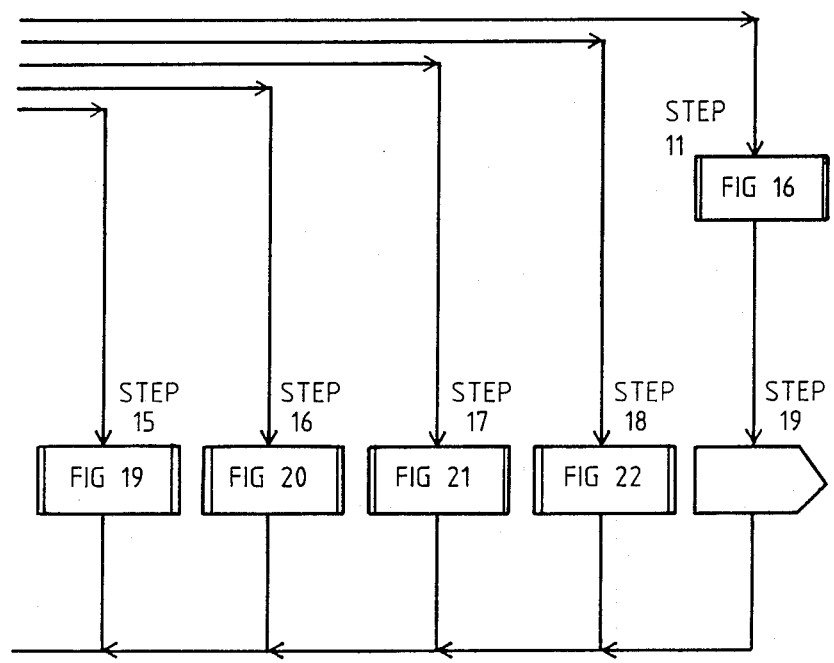

FIGS. 6, 6a and 6b show a Switch Input routine, SWI.

STEP 1. This step causes the Switch Input routine to be entered.

STEP 2. This step determines the clock state. If the Plane 1 clocks, P1 CLKS are faulty, step 3 is performed. If the clocks are not faulty CLKS OK, step 7 is performed. If the Plane 0 clocks are faulty, P0 CLKS step 5 is performed.

STEP 3. This step sends Plane 0 data to the peripheral.

STEP 4. This step ensures that all subsequent plane selections are ignored.

STEP 5. This step sends Plane 1 data to the peripheral.

STEP 6. This step ensures that all subsequent plane selections are ignored.

STEP 7. This step determines the lock state, as follows:
Path check inhibit PCI. If this state exists, step 8 is performed.
Lock to Plane 0, LP0. If this state exists, step 9 is performed.
No Lock, NL. If this state exists, step 12 is performed.
Lock to Plane 1, LP1. If this state exists step 11 is performed.

STEP 8. This step performs a Path Check Inhibit 1 routine as described with reference to FIG. 15.

STEP 9. This step performs a Path Check Inhibit 2 routine as described with reference to FIG. 16.

STEP 10. This step ensures that Plane 0 data is sent to the peripheral.

STEP 11. This step performs a Path Check Inhibit 2 routine, as described with reference to FIG. 16.

STEP 12. This step determines the state of the peripheral card controller, as follows:
Check for Discrepancy, CFD. If this state exists step 13 is performed.
Persisting Discrepancy, PD. If this state exists step 14 is performed.
Looking for Pattern 0, LP0. If this state exists step 15 is performed.
Looking for Pattern 1, LP1. If this state exists step 16 is performed.
Path Check Continue, PCC. If this state exists step 17 is performed.
Path Check Complete, PCCM. If this state exists step 18 is performed.

STEP 13. This step performs a Checking routine as described with reference to FIG. 17.

STEP 14. This step performs a Persist routine as described with reference to FIG. 18.

Figure 19:
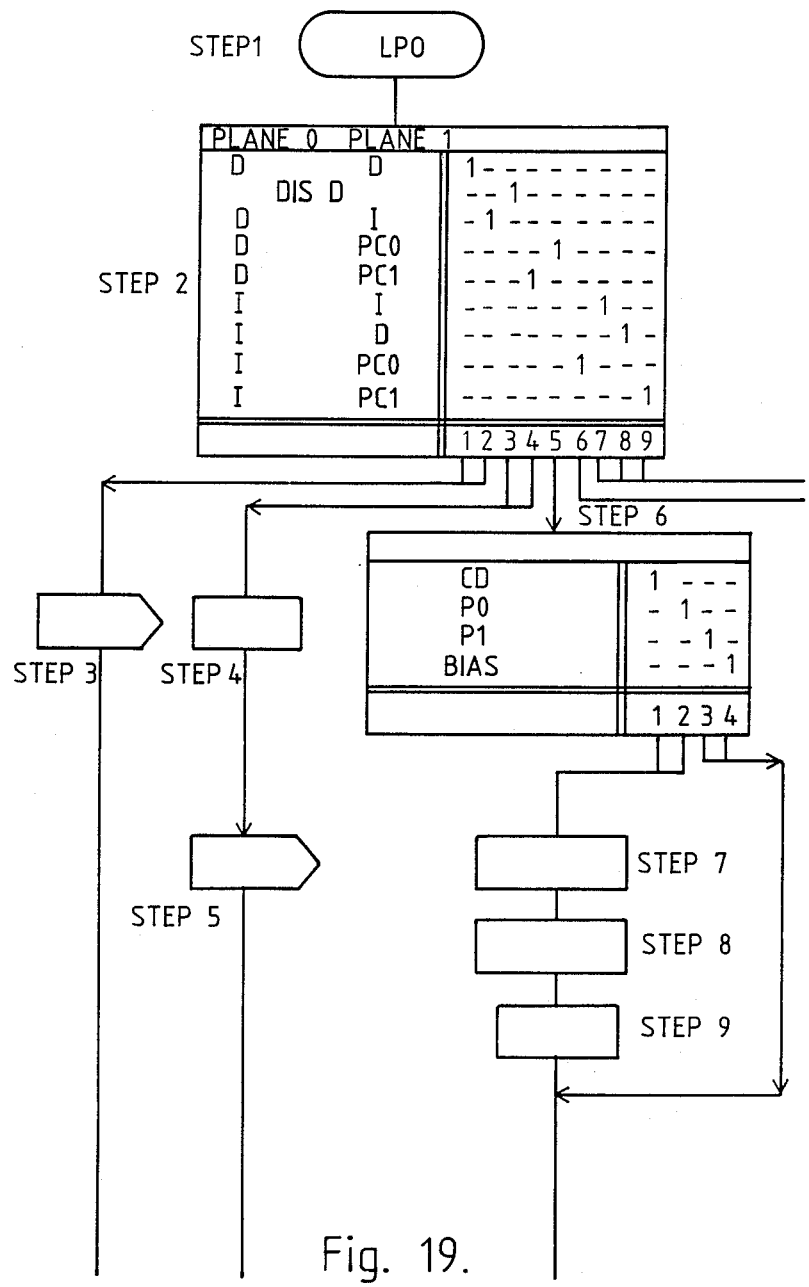
FIGS. 19, 19a, 19b and 19c show a flow diagram of a Looking for Pattern 0 routine, when
Figure 19A:
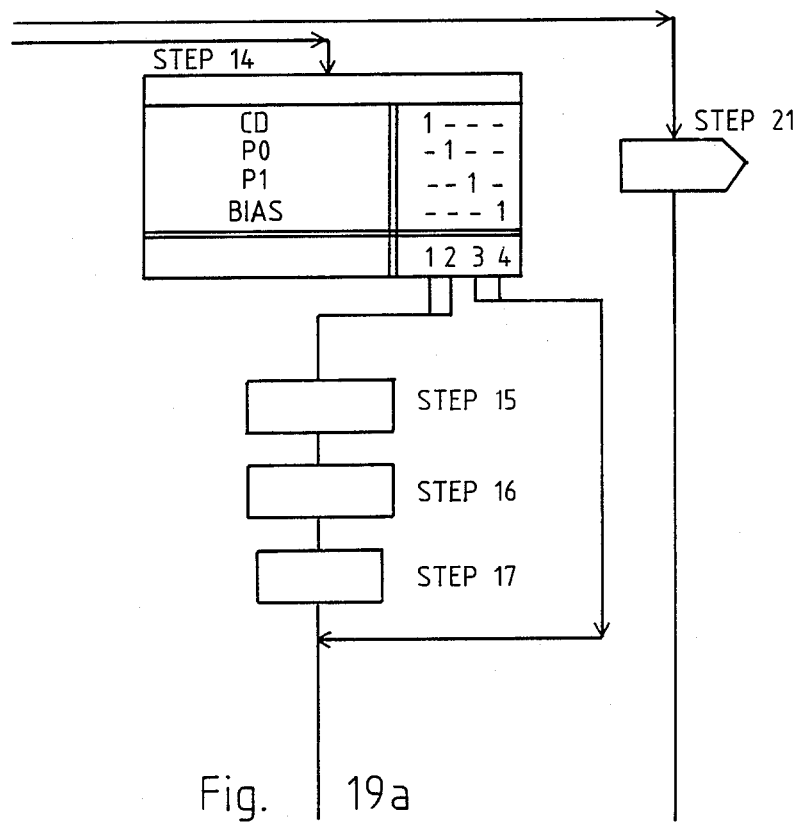
Figure 19B:
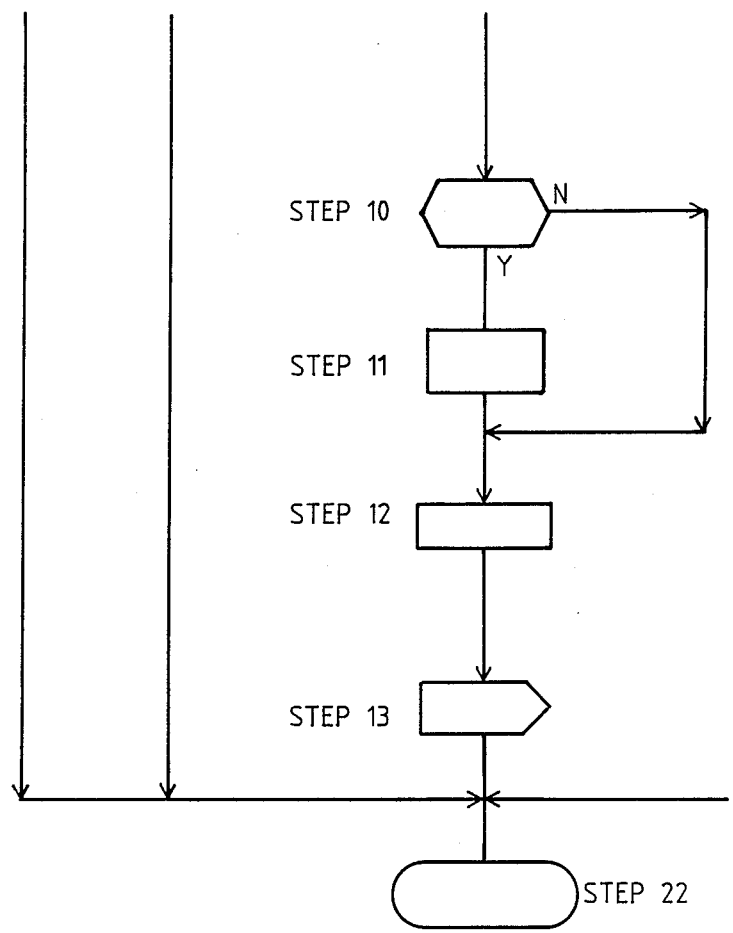
Figure 19C:
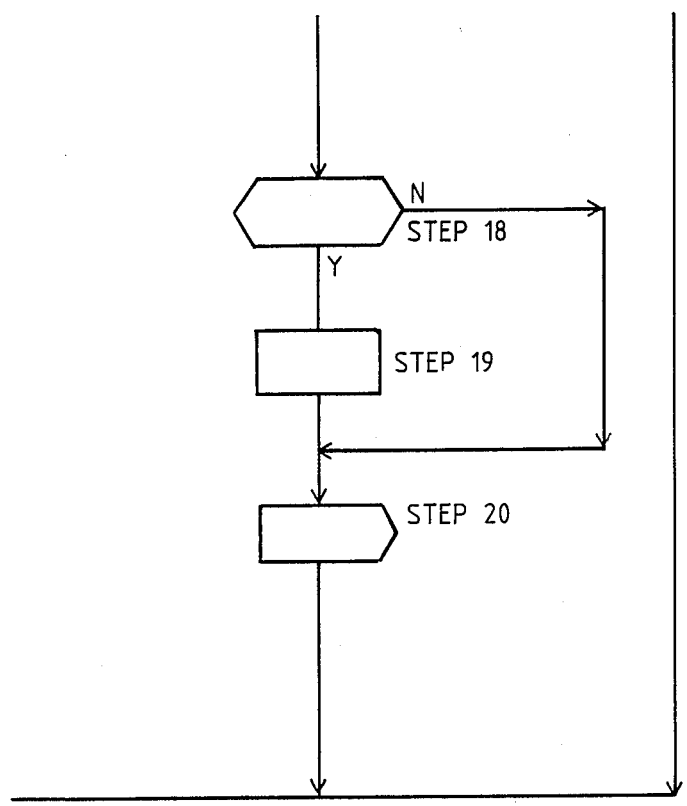

STEP 15. This step performs a Looking for Pattern 0 routine as described with reference to FIG. 19.

STEP 16. This step performs a Looking for Pattern 1 routine as described with reference to FIG. 20.

STEP 17. This step performs a Path Check Continue routine as described with reference to FIG. 21.

STEP 18. This step performs a Plane Select routine as described with reference to FIG. 22.

STEP 19. This step ensures that Plane 1 data is sent to the peripheral.

STEP 20. This step causes exit from the Switch Input routine.

Figure 7A:
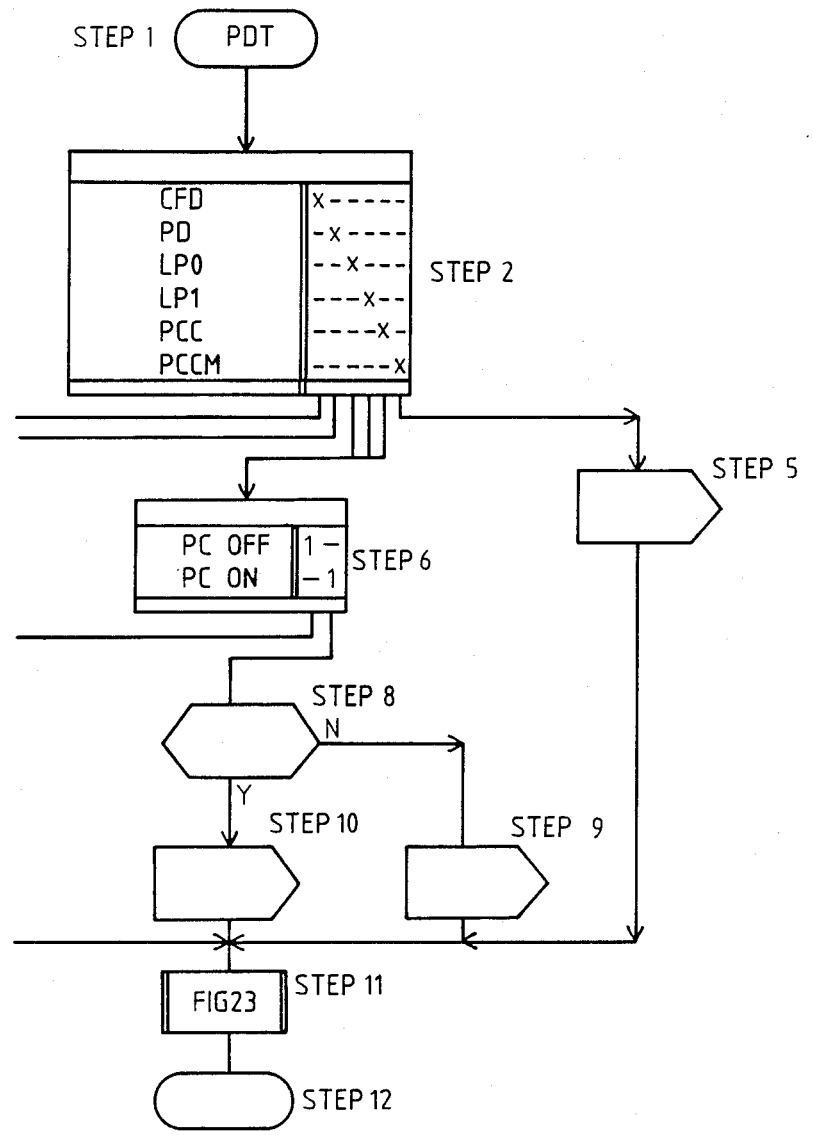

FIG. 7 and 7a show a Peripheral Data routine, PDT.

STEP 1. This step causes the Peripheral Data routine to be entered.

STEP 2. This step determines the state of the peripheral card controller and the resulting action as follows:
Checking for Discrepancy, CFD. If this state exists, step 3 is performed.
Persisting Discrepancy, PD. If this state exists, step 4 is performed.

Looking for Pattern 0, LP0. If this state exists, step 6 is performed.
Looking for Pattern 1, LP1. If this state exists, step 6 is performed.
Path Check Continue, PCC. If this state exists, step 6 is performed.
Path Check Complete, PCCM. If this state exists, step 5 is performed.

STEP 3. This step transmits data for Plane 0 and data for Plane 1 to the switching arrangement.

STEP 4. This step transmits data for Plane 0 and data for Plane 1 to the switching arrangement.

STEP 5. This step transmits data for Plane 0 and data for Plane 1 to the switching arrangement.

STEP 6. This step determines whether the path state is path checking on or off. If the off state is determined, step 7 is performed. If the one state is determined, step 8 is performed.

STEP 7. This step transmits data for Plane 0 and data for plane 1 to the switching arrangement.

STEP 8. This step determines if the transmit bit is set to pattern 1. If it is not set, step 9 is performed if it is set, step 10 is performed.

STEP 9. This step transmits data for Plane 0, and the pattern 0 to Plane 1.

STEP 10. This step transmits data for Plane 0, and pattern 1 to Plane 1.

STEP 11. This step performs a Bias Transmit routine to be performed as described with reference to FIG. 23.

STEP 12. This step causes exit from the peripheral data routine.

FIG. 8 shows a Reset Alarm routine RA.

STEP 1. This step causes the Reset Alarm routine RA to be entered.

STEP 2. This step sets the clocks to not faulty.

STEP 3. This step sets the peripheral card controller state to: Checking for a Discrepancy.

STEP 4. This step sets the path states for all timeslots to Checking for a Discrepancy.

STEP 5. This step resets a request to send an alarm.

STEP 6. This step sets the faulty timeslot number in the speech fault register to 00 in hexadecimal.

STEP 7. This step sets the fault type to 00.

STEP 8. This step sets the fault count to zero.

STEP 9. This step resets the speech fault bit.

STEP 10. This step resets the low frequency sync counter.

STEP 11. This step sets the transmit bit to zero.

STEP 12. This step causes exit from the reset alarm routine.

Figure 9:
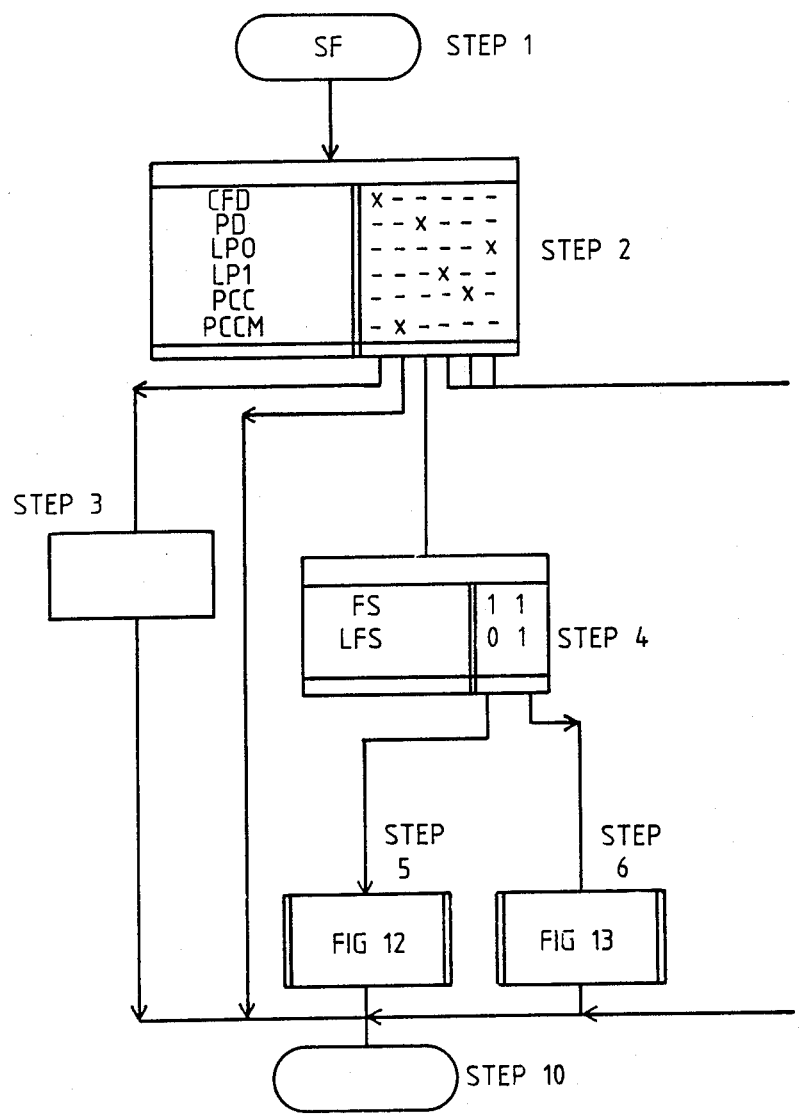
FIGS. 9 and 9a show a flow diagram of a Sync Function routine, when
Figure 9A:
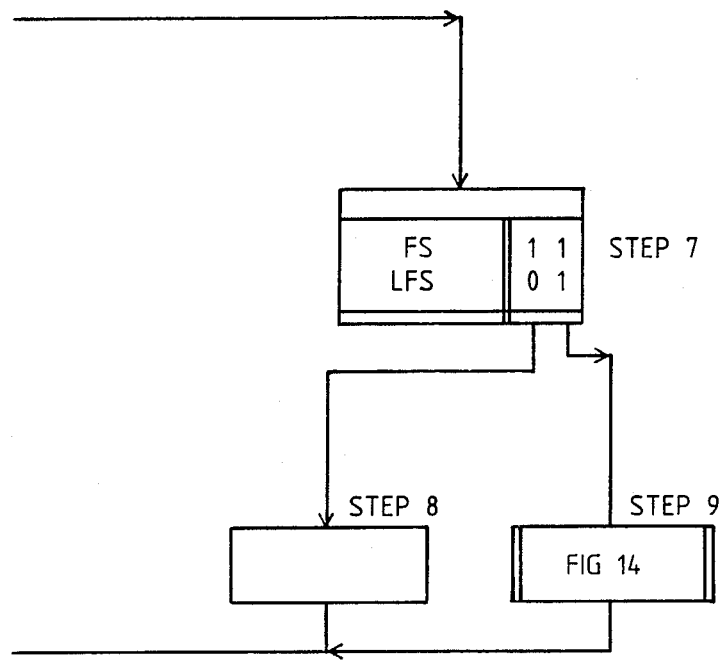

FIGS. 9 and 9a show the Sync Function, SF.

STEP 1. This step causes the sync function to be entered.

STEP 2. This step determines the state of the peripheral card controller and the resulting action as follows:

Check for Discrepancy, CFD. If this state exists, step 3 is performed.
Persisting Discrepancy, PD. If this state exists, step 4 is performed.
Looking for Pattern 0, LP0. If this state exists, step 7 is performed.
Looking for Pattern 1, LP1. If this state exists, step 7 is performed.
Path Check Continue, PCC. If this state exists, step 7 is performed.
Path Check Complete, PCCM. If this state exists, step 10 is performed.

STEP 3. This step sets the fault counter to zero.

STEP 4. This step determines the state of the frame sync, FS, and low frequency sync LFS. If the states are 1,0 respectively, step 5 is performed. If the states are, 1,1, step 6 is performed.

STEP 5. This step causes the Fault Check 1 routine to be performed as described with reference to FIG. 12.

STEP 6. This step causes the Fault Check 2 routine to be performed, as described with reference to FIG. 13.

STEP 7. This step determines the state of the Frame Sync FS and the low frequency sync LFS. If the states are 1,0 respectively step 8 is performed. If the states are 1,1, step 9 is performed.

STEP 8. This step toggles the transmit bit.

STEP 9. This step causes the Low Frequency Sync routine, to be performed, as described with reference to FIG. 13.

STEP 10. This step causes exit from the Sync Function routine.

Figure 10:
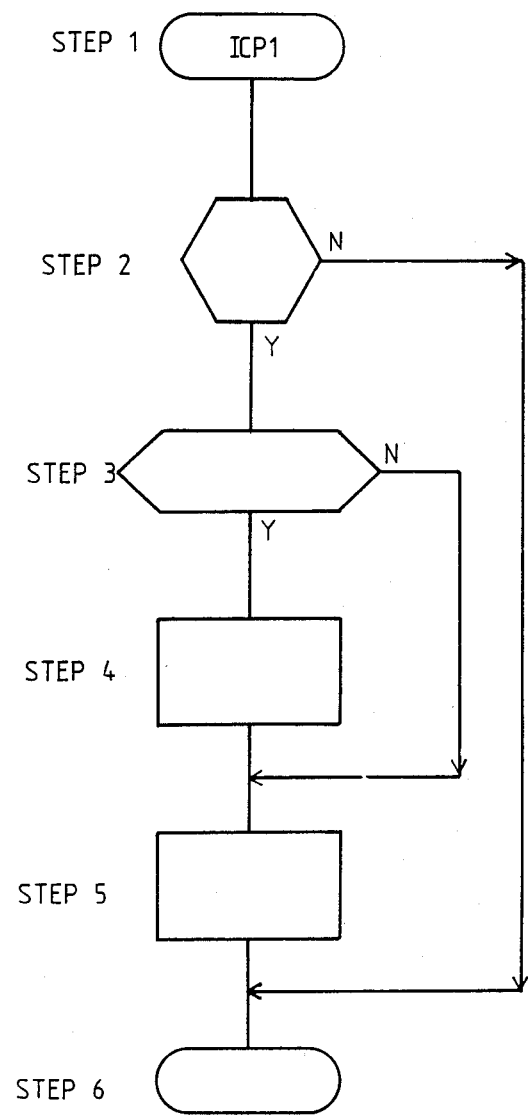
FIG. 10 shows a flow diagram of an Inhibit Check Persist 1 routine.

FIG. 10 shows an Inhibit Check Persist 1 routine. ICP1.

STEP 1. This step causes the inhibit check persist 1 routine to be entered.

STEP 2. This step checks whether the speech fault bit is set. If not, step 6 is performed, if the bit is set, step 3 is performed.

STEP 3. This step checks whether the fault count is less then the value stored. If it is not step 5 is performed. If it is less, then step 4 is performed.

STEP 4. This step causes a fault counter to be incremented.

STEP 5. This step causes the fault bit to be reset.

STEP 6. This step causes exit from the Inhibit Check Persist 1 routine.

Figure 11:
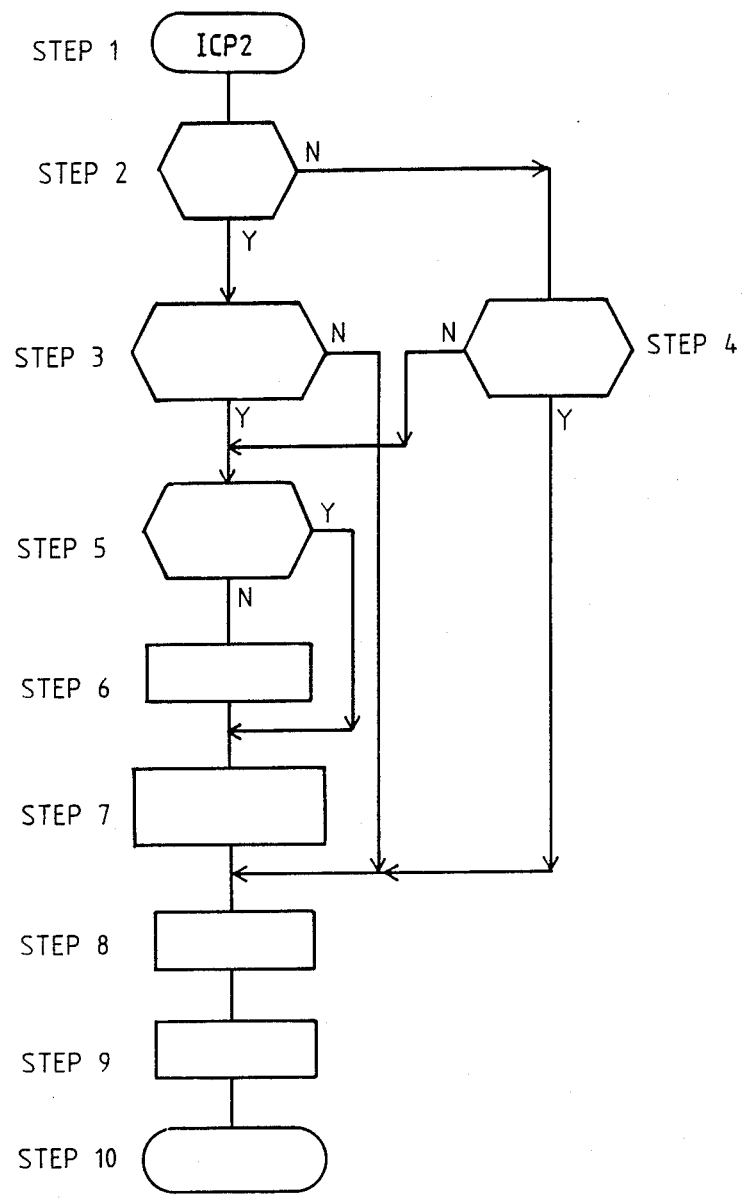
FIG. 11 shows a flow diagram of an Inhibit Check Persist 2 routine.

FIG. 11 shows an Inhibit Check Persist 2 routine, ICP2.

STEP 1. This step causes the Inhibit Check Persist 2 routine to be entered.

STEP 2. The step causes a check on the speech fault bit to be made. If the bit is set, step 3 is performed. If the bit is not set step 4 is performed.

STEP 3. This step determines whether the fault count is greater then the value stored minus one. If it is, step 5 is performed, If it is not, step 8 is performed.

STEP 4. THis step determines whether the fault count is less than the value stored. If it is, step 8 is performed. If it is not, step 5 is performed.

STEP 5. This step determines whether a plane is locked to either Plane 1 or Plane 0. If it is, step 7 is performed. If it is not step 6 is performed.

STEP 6. This step causes a request to send an alarm to be raised.

STEP 7. This step causes a speech discrepancy flag to be set in the fault register.

STEP 8. This step causes the fault count to be reset.

STEP 9. This step causes a fault bit to be reset.

STEP 10. This step causes exit from the Inhibit Check Persist 2 routine.

Figure 12:
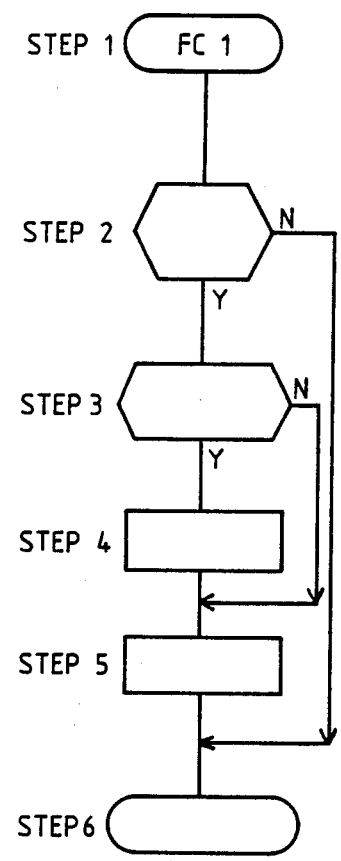
FIG. 12 shows a flow diagram of a Fault Check 1 routine.

FIG. 12 shows the Fault Check 1 routine, FC1.

STEP 1. During this step the FC1 routine is entered.

STEP 2. This step checks if the speech fault bit is set. If not, step 6, exit FC1 is performed. If the bit is set, step 3 is performed.

STEP 3. This step checks if the fault count is less then the value stored. If not, step 5 is performed. If it is less then the value stored, step 4 is performed.

STEP 4. This step increments the fault count.

STEP 5. This step resets the speech fault bit.

STEP 6. This step causes exit from the Fault Check 1 routine.

Figure 13:
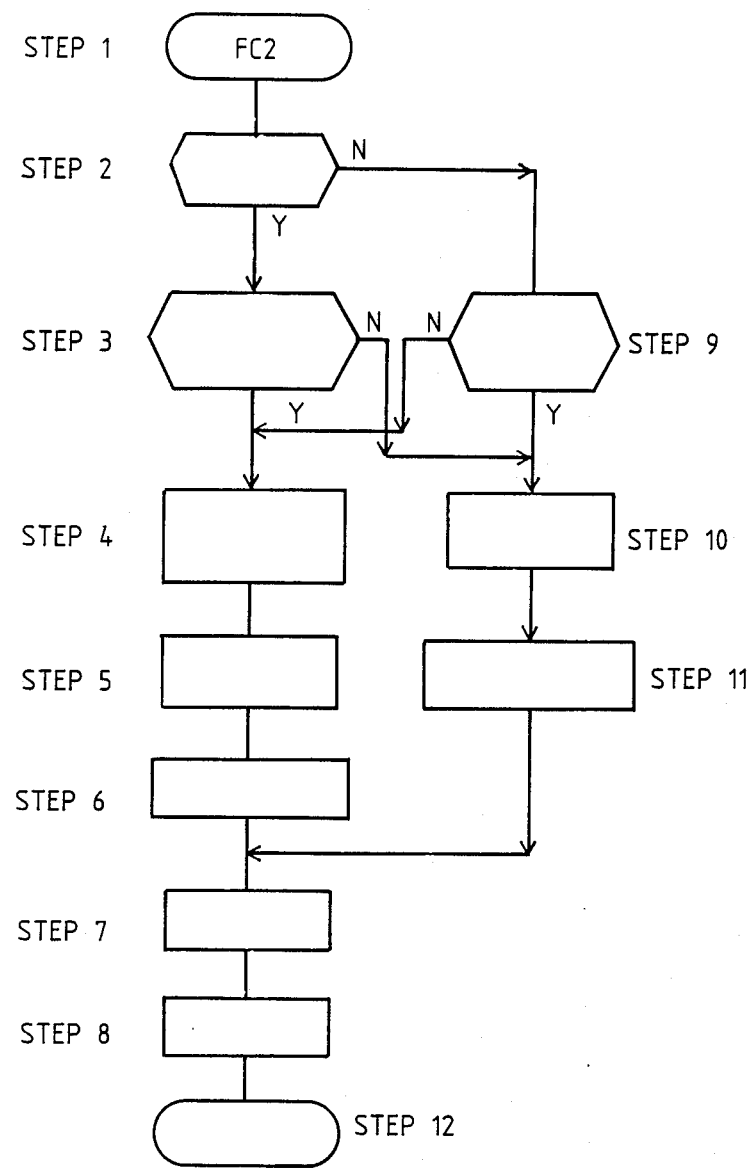
FIG. 13 shows a flow diagram of a Fault Check 2 routine.

FIG. 13 shows the Fault Check 2 routine FC2.

STEP 1. During this step the Fault Check 2 routine is entered.

STEP 2. This step checks if the fault bit is set. If not, step 9 is performed. If it is set, step 3 is performed.

STEP 3. This step checks if the fault count is greater than the value stored minus one. If it is not, step 10 is performed. If it is greater, step 4 is performed.

STEP 4. This step, at the start of time slot 1 sets the peripheral card controller to the state: Looking for Pattern 0.

STEP 5. This step resets the low frequency sync counter.

STEP 6. This step sets the transmit bit to pattern 0.

STEP 7. This step resets the fault count.

STEP 8. This step resets the speech fault bit.

STEP 9. This step checks if the fault count is less than the value stored. If it is not, step 4 is performed. If it is less, step 10 is performed.

STEP 10. This step sets the peripheral card controller to the state: Checking for Discrepancy.

STEP 11. This step sets the path state to path checking off for all timeslots, step 7 is then performed.

STEP 12. This step causes exit from the Fault Check 2 routine.

Figure 14:
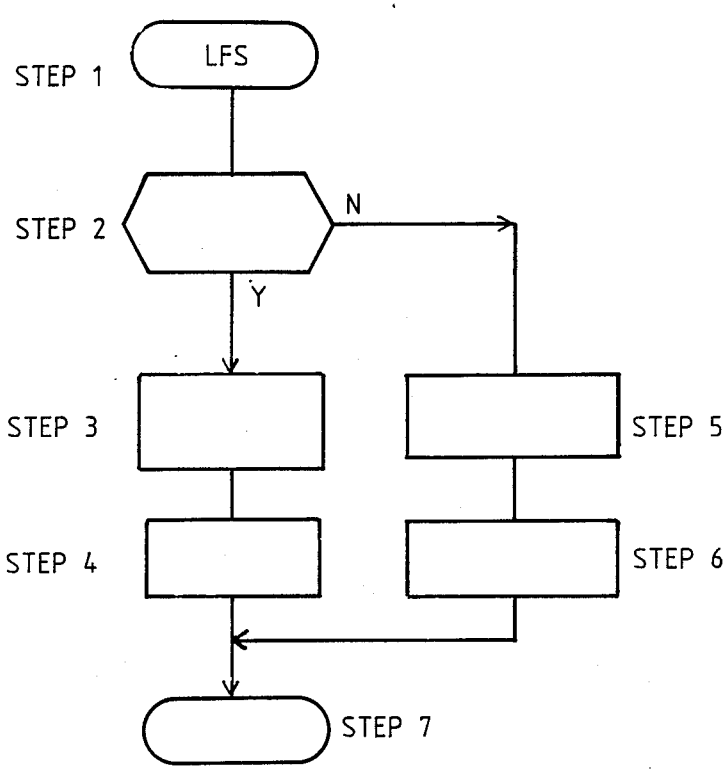
FIG. 14 shows a flow diagram of a Low Frequency Sync routine.

FIG. 14 shows the Low Frequency Sync routine LFS.

STEP 1. During this step the Low Frequency Sync routine is entered.

STEP 2. This step checks if the low frequency sync counter is greater than zero. If it is, step 3 is performed, if it is not, step 5 is performed.

STEP 3. This step changes the state of the peripheral card controller to Path Check Complete.

STEP 4. This step sets a request to send an alarm.

STEP 5. This step increments the low frequency sync counter.

STEP 6. This step sets the transmit bit to pattern 0.

STEP 7. This step exits the Low Frequency Sync routine.

Figure 15:
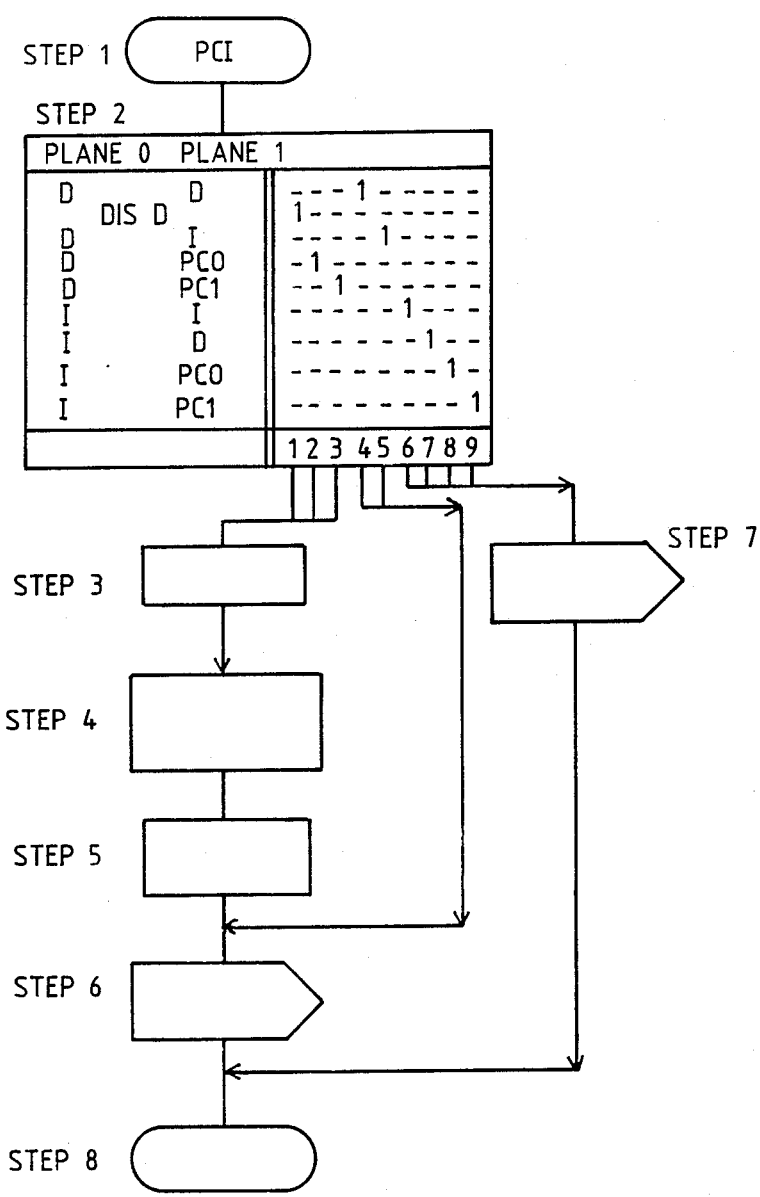
FIG. 15 shows a flow diagram of a Path Check Inhibit 1 routine.

FIG. 15 shows the Path Check Inhibit 1 routine PC11.

STEP 1. This step causes the Path Check Inhibit 1 routine to be entered.

STEP 2. This step determines the data content of Plane 0 and Plane 1 and the action to be taken as follows:

If data D, is present for both Plane 0 and Plane 1 is no discrepancy step 6 is performed.

If discrepant data, DIS D, is present, step 3 is performed.

If data D is present for Plane 0, and Plane 1 is idle I, step 6 is performed.

If data D is present for Plane 0, and path check pattern 0, PCO, is present for Plane 1, step 3 is performed.

If data D is present for Plane 0, and path check 1, PC1, is present for Plane 1 step 3 is performed.

If both planes are idle I, step 7 is performed.

If Plane 0 is idle, I, and data D, is present for Plane 1, step 7 is performed.

If Plane 0 is idle I, and path check 0 PC0, is present for Plane 1, step 7 is performed.

If Plane 0 is idle I, and path check 1 PC1, is present for Plane 1, step 7 is performed.

STEP 3. This step causes the speech fault bit to be set.

STEP 4. This step causes the faulty timeslot number in the speech fault register to be set to the current timeslot number.

STEP 5. This step causes the fault type in the speech fault register to be set to pattern 0.

STEP 6. This step causes Plane 0 data to be sent to the peripheral.

STEP 7. This step causes Plane 1 data to be sent to the peripheral.

STEP 8. This step causes exit from the Path Check Inhibit 1 routine.

Figure 16:
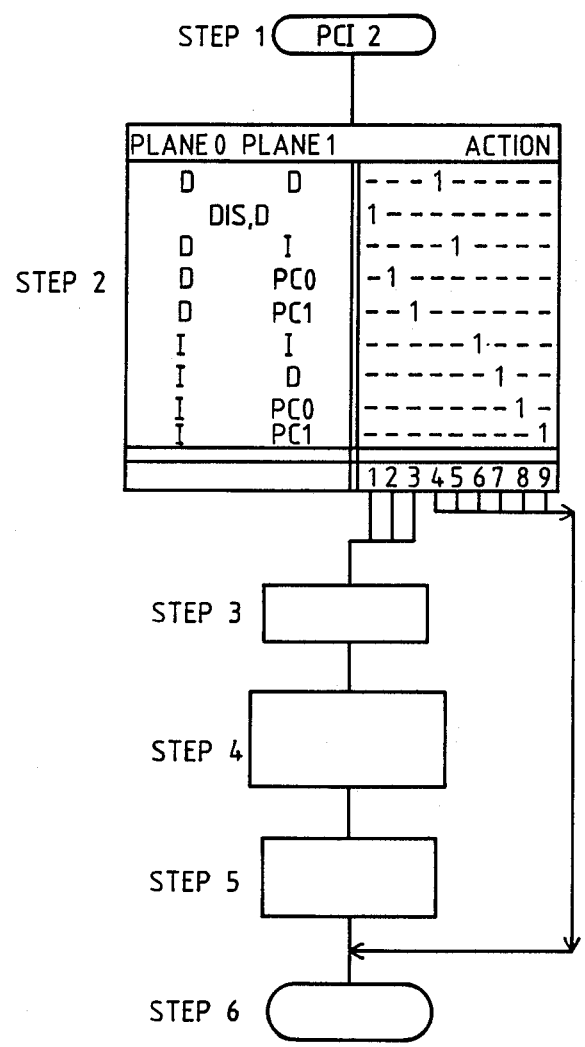
FIG. 16 shows a flow diagram of a Path Check Inhibit 2 routine.

FIG. 16 shows the Path Check Inhibit 2 routine.

STEP 1. This step causes the Path Check Inhibit 2 routine to be entered.

STEP 2. This step determines the data content of Plane 0 and Plane 1 and action to be taken as follows:

If data D, is present for both Plane 0 and Plane 1, step 6 is performed.

If discrepant data, DIS D, is present, step 3 is performed.

If data D is present for Plane 0, and Plane 1 is idle I, step 6 is performed.

If data D is present for Plane 0 and path check 0, PC0, is present for Plane 1, step 3 is performed.

If data D is present for Plane 0, and path check 1, PC1, is present for Plane 1, step 3 is performed.

If both planes are idle I, step 6 is performed.

If Plane 0 is idle I, and Plane 1 has data D present, step 6 is performed.

If Plane 0 is idle, I and Plane 1 has path check 0, PC0, present, step 6 is performed.

If Plane 0 is idle, I and Plane 1 has path check 1, PC1; present, step 6 is performed.

STEP 3. This step causes the speech fault bit to be set.

STEP 4. This step causes the faulty timeslot number in the speech fault register to be set to the current timeslot number.

STEP 5. This step causes the fault type in the speech fault register to be set to pattern 0.

STEP 6. This step causes exit from the Path Check Inhibit 2 routine.

Figure 17:
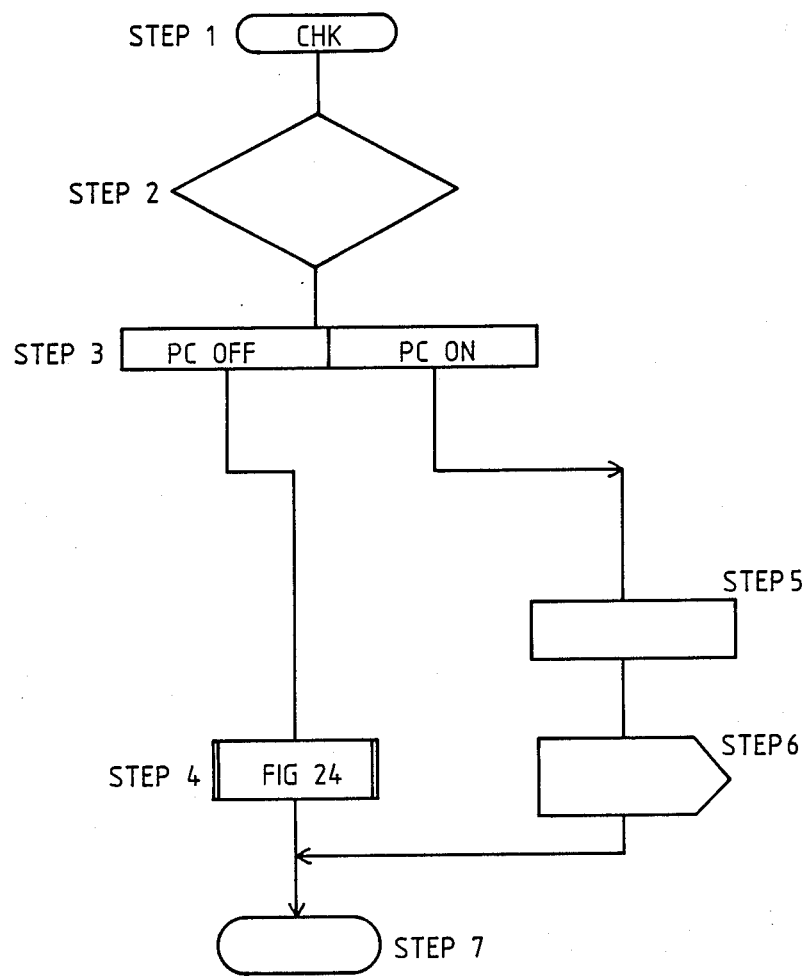
FIG. 17 shows a flow diagram of a Checking routine.

FIG. 17 shows a Checking routine CHK.

STEP 1. This step causes the Checking routine to be entered.

STEP 2 and STEP 3. These steps switch on a path state, and determines if it is path checking on or off. If it is path checking on, step 5 is performed. If it is path checking off, step 4 is performed.

STEP 4. This step causes a Valid routine to be performed, as described with reference to FIG. 24.

STEP 5. This step sets the path state to path checking off.

STEP 6. This step causes Plane 0 data to be sent to the peripheral.

STEP 7. This step causes exit from the Checking routine.

Figure 18:
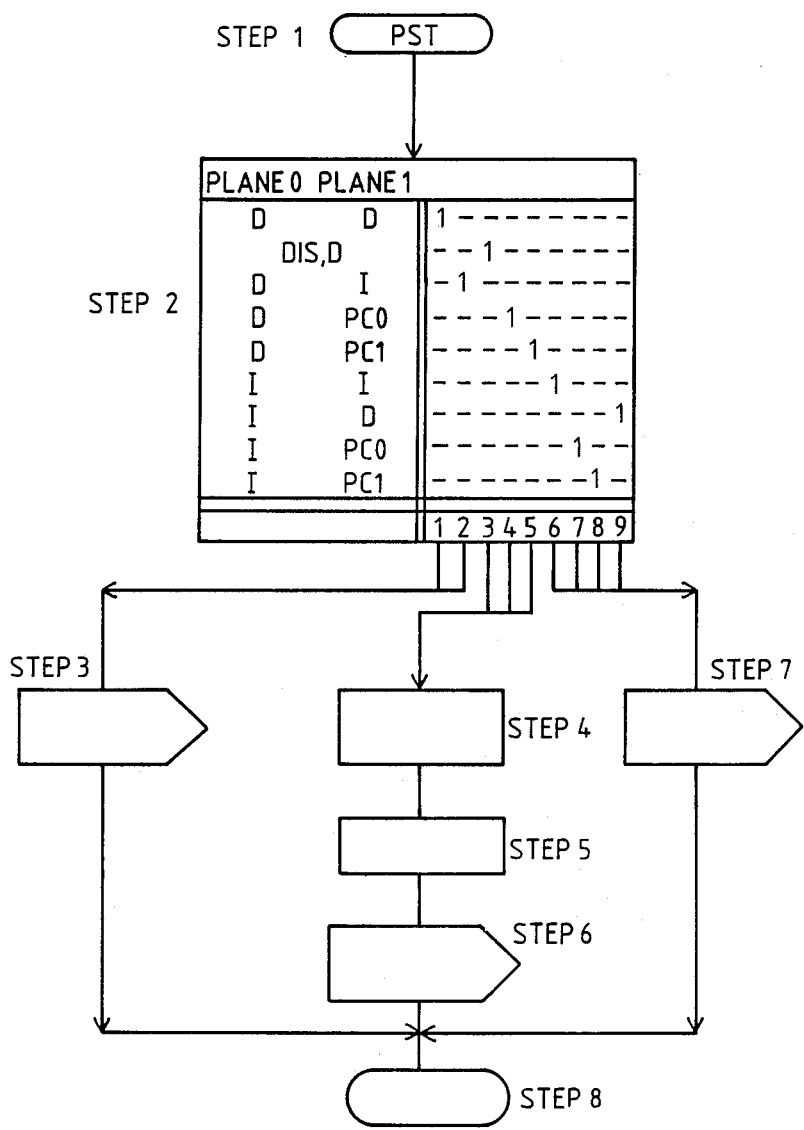
FIG. 18 shows a flow diagram of a Persisting routine.

FIG. 18 shows a Persist routine. PST.

STEP 1. This step causes the Persist routine to be entered.

STEP 2. This step determines the data content of Plane 0 and Plane 1 and the action to be taken.

If data D, is present for Plane 0 and Plane 1, step 3 is performed.

If discrepant data, DIS D, is present, step 4 is performed.

If data D is available for Plane 0 and Plane 1 is idle, I; step 3 is performed.

If data D is available for Plane 0, and Plane 1 has path check 0, PC0; present, step 4 is performed.

If data D is available for Plane 0, and Plane 1 has path check 1, PC1; present, step 4 is performed.

If both planes are idle I,I; step 7 is performed.

If Plane 0 is idle I, and data D is present for Plane 1, step 7 is performed.

If Plane 0 is idle I, and Plane 1 has path check 0, PC0; present, step 7 is performed.

If Plane 0 is idle I, and Plane 1 has path check 1, PC1; present, step 7 is performed.

STEP 3. This step causes Plane 0 data to be sent to the peripheral.

STEP 4. This step causes the path state to be in path checking on.

STEP 5. This step causes the speech fault bit to be set.

STEP 6. This step causes Plane 0 data to be sent to the peripheral.

STEP 7. This step causes Plane 1 data to be sent to the peripheral.

STEP 8. This step causes exit from the Persist routine.

FIGS. 19, 19a, 19b and 19c shows the Looking for Pattern 0 routine, LP0.

STEP 1. This step causes the Looking for Pattern 0 routine to be entered.

STEP 2. This step determines the data content of Plane 0 and Plane 1, and the action to be taken as follows:

If data D, is available for Plane 0 and Plane 1, step 3 is performed.

If discrepant data, DIS D, is present, step 4 is performed.

If data D, is available for Plane 0, and Plane 1 is idle I, step 3 is performed.

If data D is available for Plane 0, and Plane 1 has path check 0, PC0; present, step 6 is performed.

If data D is available for Plane 0, and Plane 1 has path check 1, PC1; present, step 4 is performed.

If both planes are idle I,I, step 21 is performed.

If Plane 0 is idle I, and data D is available for Plane 1, step 21 is performed.

If Plane 0 is idle I, and Plane 1 has path check 0, PC0; present, step 14 is performed.

If Plane 0 is idle I, and Plane 1 has path check 1, PC1; present, step 21 is performed.

STEP 3. This step causes Plane 0 data to be sent to the peripheral.

STEP 4. This step causes the path state to be forced to path checking on.

STEP 5. This step causes Plane 0 data to be sent to the peripheral.

STEP 6. This step determines the fault type in the speech fault register and the action to be taken as follows:

If Checking for Discrepancy is present, step 7 is performed.

If Pattern 0 is present, step 7 is performed.

If Pattern 1, is present, step 10 is performed.

If Bias is present, step 10 is performed.

STEP 7. This step causes the faulty timeslot number in the speech fault register to be set to the current timeslot number.

STEP 8. This step causes the fault type in the speech fault register to be set to pattern 1.

STEP 9. This step causes the peripheral card controller to be put in a state: Looking for Pattern 1.

STEP 10. This step determines whether the current timeslot number equals the number stored in the speech fault register. If it does not, step 12 is performed. If it does, step 11 is performed.

STEP 11. This step causes the peripheral card controller to be put in a state: Looking for Pattern 1.

STEP 12. This step causes the path state to be put to Path Checking On.

STEP 13. This step causes Plane 0 data to be sent to the peripheral.

STEP 14. This step determines the fault type in the speech fault register and the action to be taken as follows:

If Checking for Discrepancy is present, step 13 is performed.

If Pattern 0 is present, step 15 is performed.

If Pattern 1 is present, step 18 is performed.

If Bias is present, step 18 is performed.

STEP 15. This step causes the faulty timeslot number in the speech fault register to be set to the current timeslot number.

STEP 16. This step causes the fault type in the speech fault register to be set to Pattern 1.

STEP 17. This step ensures that the peripheral card controller is in the state: Looking for Pattern 1.

STEP 18. This step determines whether the current timeslot number is equal to the timeslot number stored in the speech fault register. If it does not, step 20 is performed. If it does, step 19 is performed.

STEP 19. This step ensures that the peripheral card controller is in the state: Looking for Pattern 1.

STEP 20. This step causes Plane 1 data to be sent to the peripheral.

STEP 21. This step causes Plane 1 data to be sent to the peripheral.

STEP 22. This step causes exit from the Looking for Pattern 0 routine.

Figure 20:
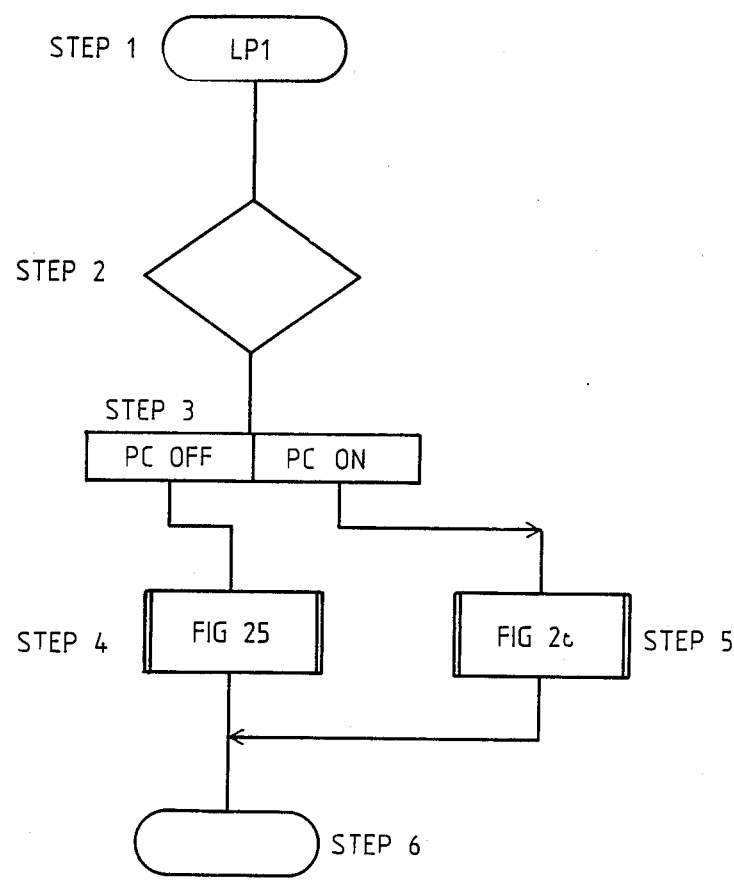

FIG. 20 shows the Looking for Pattern 1 routine, LP1.

STEP 1. This step causes the Looking for Pattern 1 to be entered.

STEP 2 and STEP 3. These steps cause the switch on of the path state. If the path state is path checking off, PC OFF, step 4 is performed. If it is path checking is on, PC ON, step 5 is performed.

STEP 4. This step causes Path Check Checking for a Discrepancy routine to be performed, and is described with reference to FIG. 25.

STEP 5. This step causes Path Check Pattern 1 routine to be performed and is described with reference to FIG. 26.

STEP 6. This step causes exit from the Looking for Pattern 1 routine.

Figure 21:
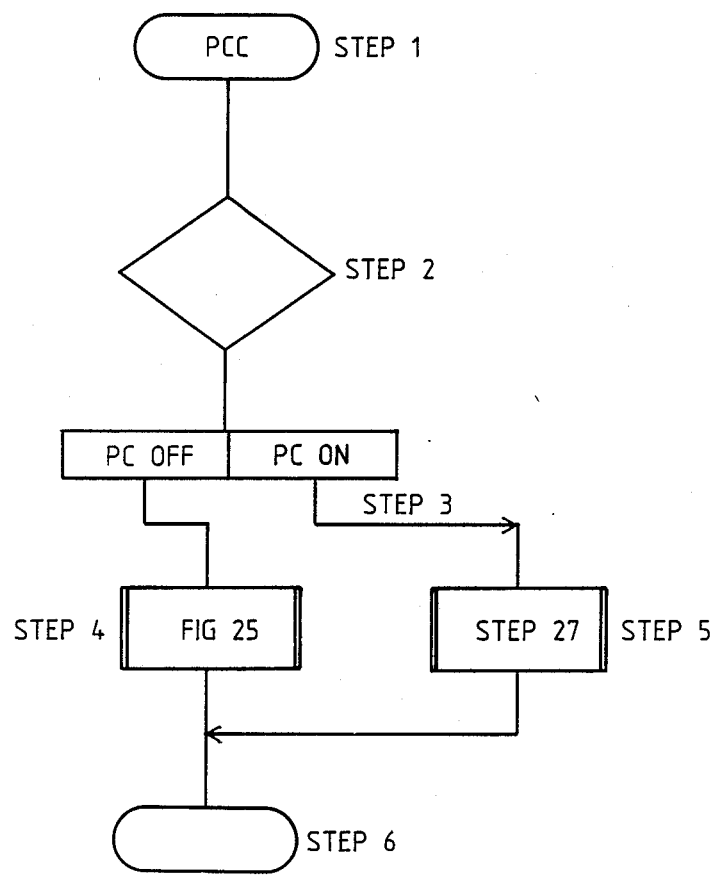
FIG. 21 shows a flow diagram of a Path Check Continue routine.

FIG. 21 shows the Path Check Continue routine, PCC.

STEP 1. This step causes the Path Check Continue routine to be entered.

STEPS 2 and 3. These steps cause switch on of the path state. If the path state is Path Checking off, PC OFF, step 4 is performed. If it is path cheching on, PC ON, step 5 is performed.

STEP 4. This step causes Path Check Checking for a Discrepancy, routine to be performed and is described with reference to FIG. 25.

STEP 5. This step causes Path Check Bias, routine to be performed and is described with reference to FIG. 27.

STEP 6. This step causes exit from the Path Check Continue routine.

Figure 22:
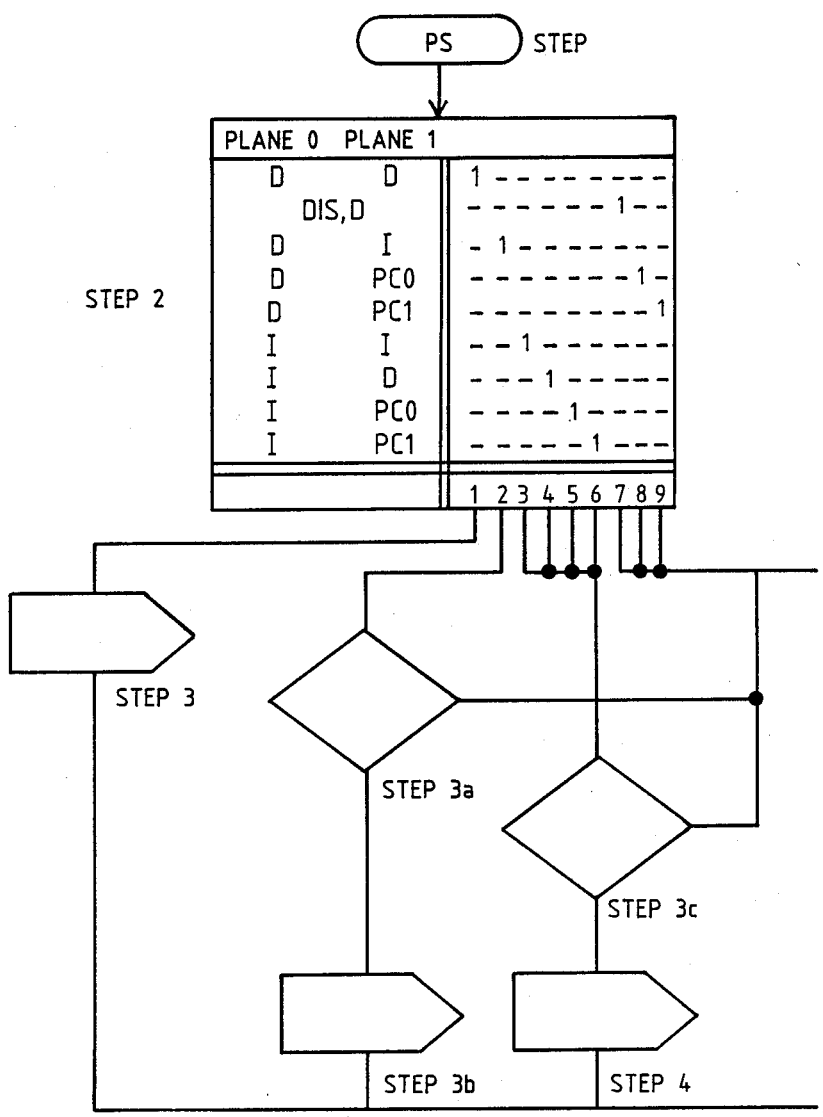
FIGS. 22 and 22a show a flow diagram of a Plane Select routine, when
Figure 22A:
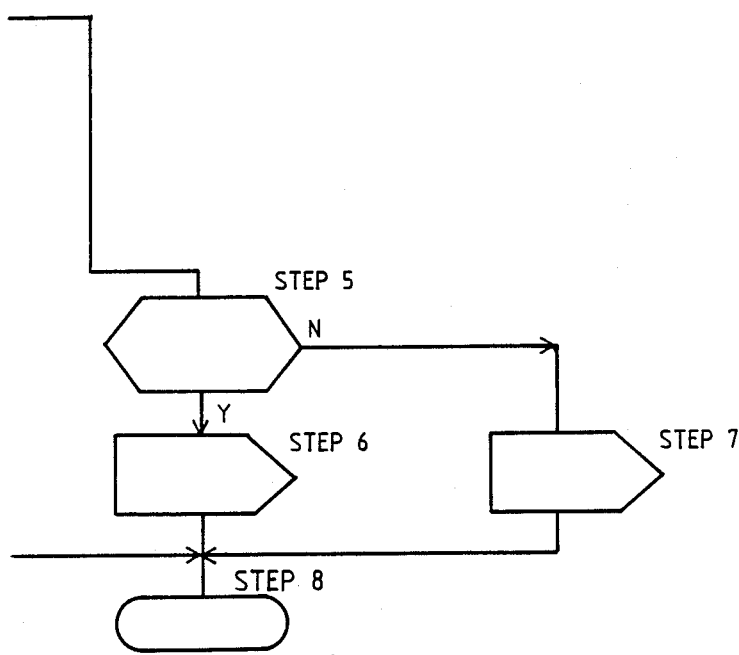

FIGS. 22 and 22a show the Plane Select routine PS.

STEP 1. This step causes the Plane Select routine to be entered.

STEP 2. This step determines the data content of Plane 0 and Plane 1, and the action to be taken as follows:

If data D, is available for Plane 0 and Plane 1, step 3 is performed.

If discrepant data, DIS D, is present, step 5 is performed.

If data D is available for Plane 0, and Plane 1 is idle I, step 3a is performed.

If data D is available for Plane 0, and Plane 1 has Path Check 0, PC0 present; step 5 is performed.

If data D is available for Plane 0, and Plane 1 has Path Check 1 present, PC 1, step 5 is performed.

If both planes are idle I,I; step 3c is performed.

If Plane 0 is idle I, and data D is available for Plane 1, step 3c is performed.

If Plane 0 is idle I, and Plane 1 has Path Check 0 PC0; present, step 3c is performed.

If Plane 0 is idle I, and Plane 1 has Path Check 1, PC1; present, step 3c is performed.

STEP 3. This step causes Plane 0 data to be sent to the peripheral.

STEP 3a. This step determines if the path state is 'Path Checking On'. If it is step 5 is performed, if not step 3b is performed.

STEP 3b. This step causes Plane 0 data to be sent to the peripheral.

STEP 3c. This step determines if the path state is 'Path Checking On'. If it is step 5 is performed, if not step 4 is performed.

STEP 4. This step causes Plane 1 data to be sent to the peripheral.

STEP 5. This step determines whether the fault type in the fault register is Continue. If not step 7 is performed. If it is, step 6 is performed.

STEP 6. This step causes Plane 1 data to be sent to the peripheral.

STEP 7. This step causes Plane 0 data to be sent to the peripheral.

STEP 8. This step causes exit from the Plane Select routine.

Figure 23:
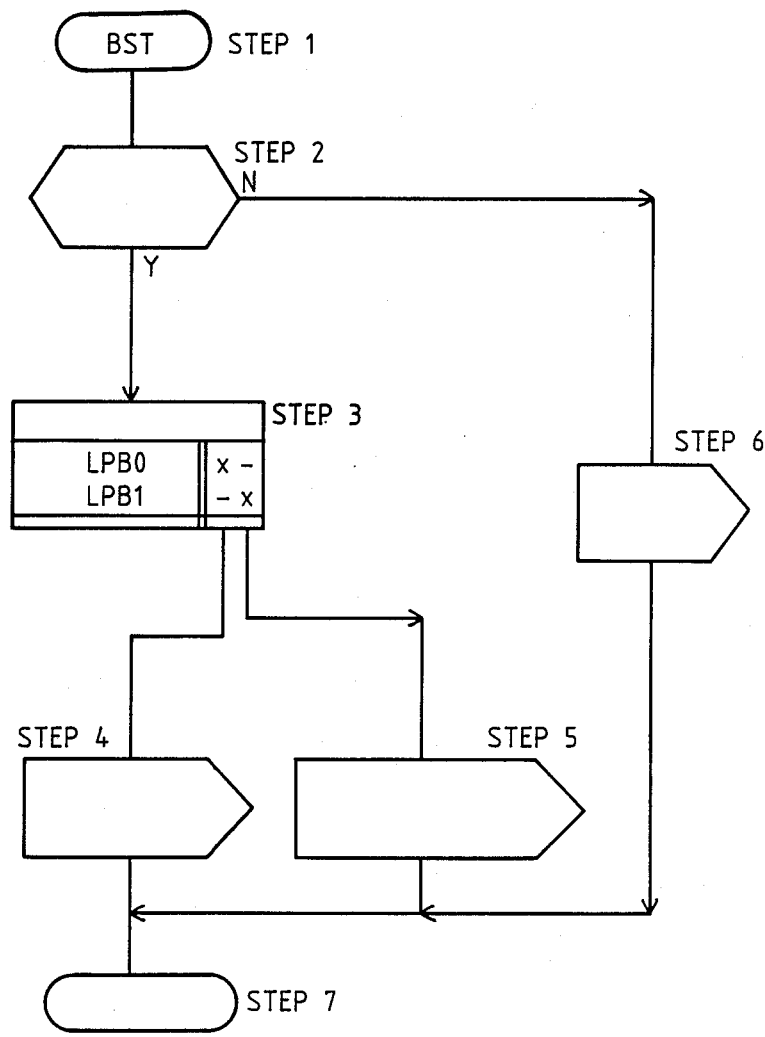
FIG. 23 shows a flow diagram of a Bias Transmit routine.

FIG. 23 shows the Bias Transmit routine BST.

STEP 1. This step causes the Bias Transmit routine to be entered.

STEP 2. This step determines whether the loop back bit is set for either Plane 0 or Plane 1. If not, step 6 is performed. If it is, step 3 is performed.

STEP 3. This step causes the loop back bits to be switched on. If the loop back bit for plane 0 LBP0 is switched on, step 4 is performed. If the loop back bit for plane 1 LBP1 is switched on, step 5 is performed.

STEP 4. This step causes the transmission of switch data for Plane 0, and the transmission of peripheral data for Plane 1.

STEP 5. This step causes the transmission of peripheral data for Plane 0, and the transmission of switch data for Plane 1.

STEP 6. This step causes the transmission of peripheral data for both planes.

STEP 7. This step causes exit from the Bias Transmit routine.

Figure 24:
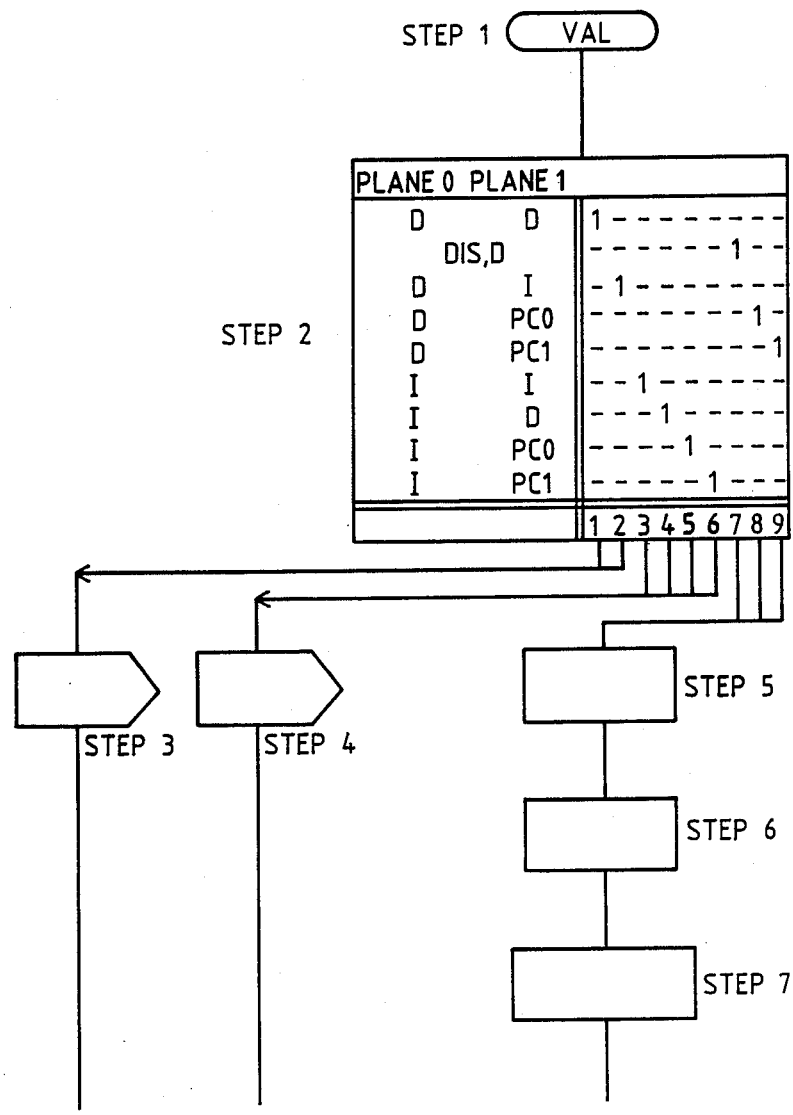
FIGS. 24 and 24a show a flow diagram of a Valid routine, when
Figure 24A:
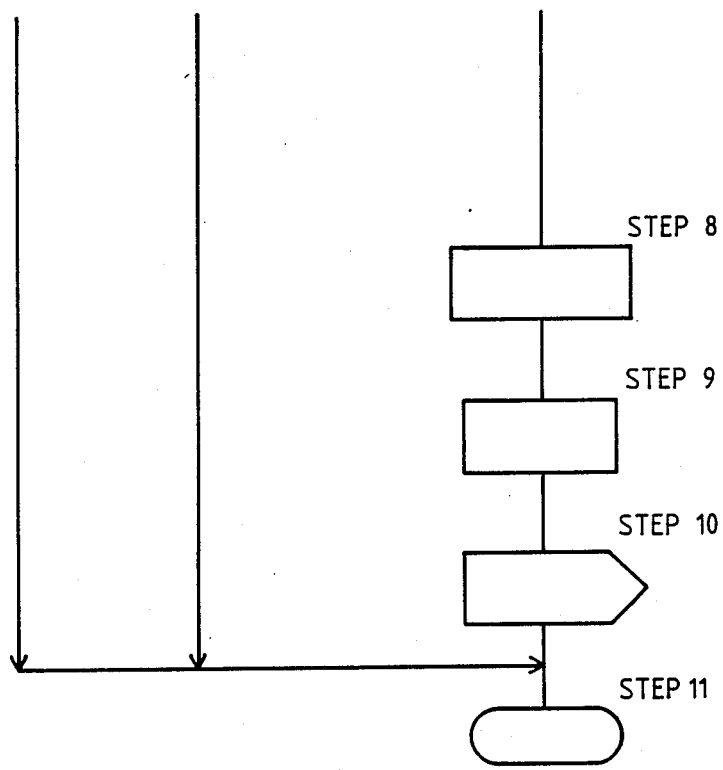

FIGS. 24 and 24a shows a Valid routine, VAL.

STEP 1. This step causes the Valid routine to be entered.

STEP 2. This step determines the state of Plane 0 and Plane 1 and the action to be taken as follows:

If data D, is available for Plane 0 and 1, step 3 is performed.

If discrepant data, DIS D, is present step 5 is performed.

If data D is available for Plane 0, and Plane 1 is idle I, step 3 is performed.

If data D is available for Plane 0, and Plane 1 has Path Check 0, PC0; present step 5 is performed.

If data D is available for Plane 0, and Plane 1 has Path Check 1, PC1; present step 5 is performed.

If both planes are idle, I,I; step 4 is performed.

If Plane 0 is idle I, and data D is available for Plane 1; step 4 is performed.

If Plane 0 is idle I, and Plane 1 has Path Check 0, PC0; present step 4 is performed.

If Plane 0 is idle, I, and Plane 1 has Path Check 1, PC1; present step 4 is performed.

STEP 3. This step causes Plane 0 data to be sent to the peripheral.

STEP 4. This step causes Plane 1 data to be sent to the peripheral.

STEP 5. This step causes the speech fault bit to be set.

STEP 6. This step causes the path state to be set to Path Checking ON.

STEP 7. This step causes the faulty timeslot number in the speech fault register to be set to the current timeslot number.

STEP 8. This step causes the fault type in the speech fault register to be set to Pattern 0.

STEP 9. This step sets the peripheral card controller state to Persisting Discrepancy.

STEP 10. This step causes Plane 0 data to be sent to the peripheral.

STEP 11. This step causes exit from the Valid routine.

Figure 25:
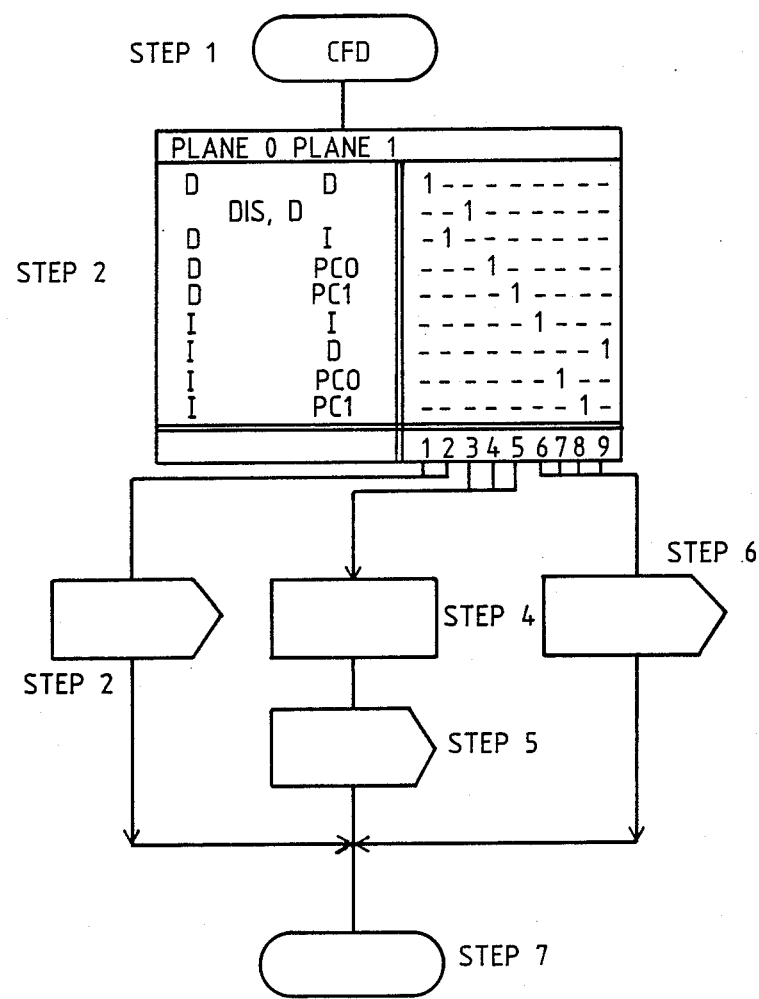
FIG. 25 shows a flow diagram of a Path Check Checking for Discrepancy routine.

FIG. 25 shows a Path Check Checking for Discrepancy routine, CFD.

STEP 1. This step causes the Path Check Checking for Discrepancy routine to be entered.

STEP 2. This step determines the data content of Plane 0 and Plane 1 and the action to be taken as follows:

If data D, is available for Plane 0 and Plane 1, step 3 is performed.

If discrepant data, DIS D, is present, step 4 is performed.

If data D is available for Plane 0, and Plane 1 is idle I, step 3 is performed.

If data D is available for Plane 0, and Plane 1 has in Path Check Pattern 0, present step 4 is performed.

If data D is available for Plane 0, and Plane 1 has Path Check Pattern 1 present, step 4 is performed.

If both Planes are idle I,I, step 6 is performed.

If Plane 0 is idle I, and data D is available for Plane 1, step 6 is performed.

If Plane 0 is idle I, and Plane 1 has Path Check Pattern 0 present, step 6 is performed.

If Plane 0 is idle I, and Plane 1 has Path Check Pattern 1 present, step 6 is performed.

STEP 3. This step causes Plane 0 data to be sent to the peripheral.

STEP 4. This step causes the path state to be set to Path Checking On.

STEP 5. This step causes Plane 0 data to be sent to the peripheral.

STEP 6. This step causes Plane 1 data to be sent to the peripheral.

STEP 7. This step causes exit from the Path Check Checking for Discrepancy routine.

Figure 26:
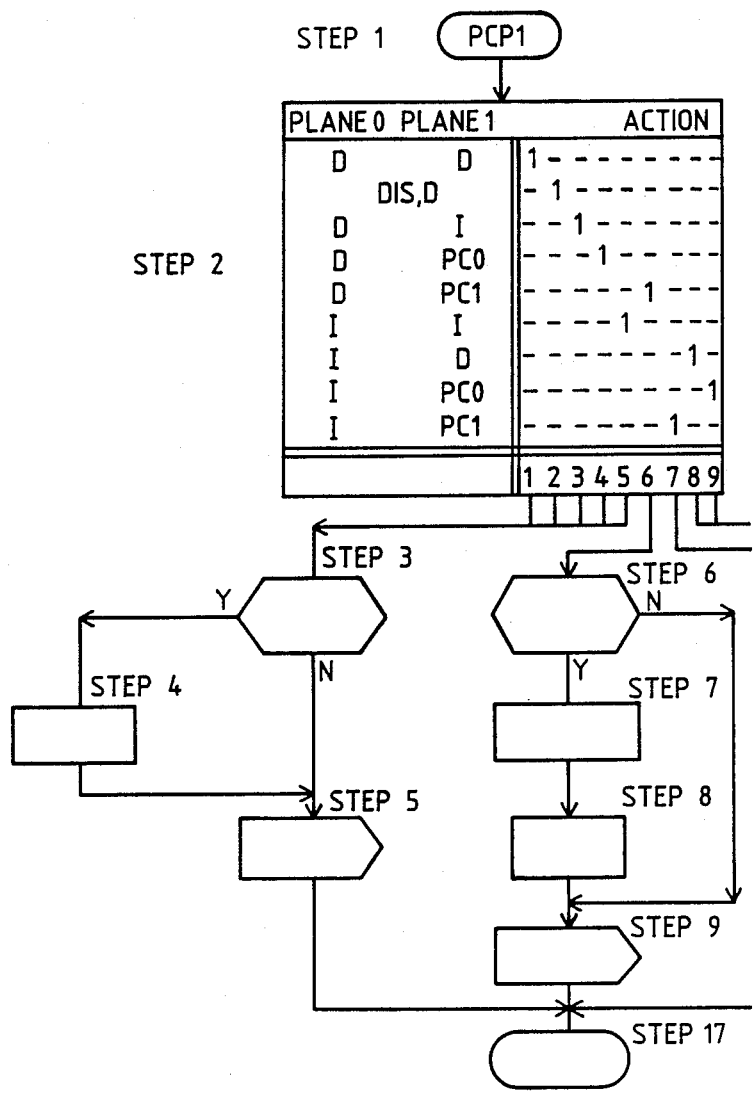
FIGS. 26 and 26a show a flow diagram of a Path Check Pattern 1 routine, when
Figure 26A:
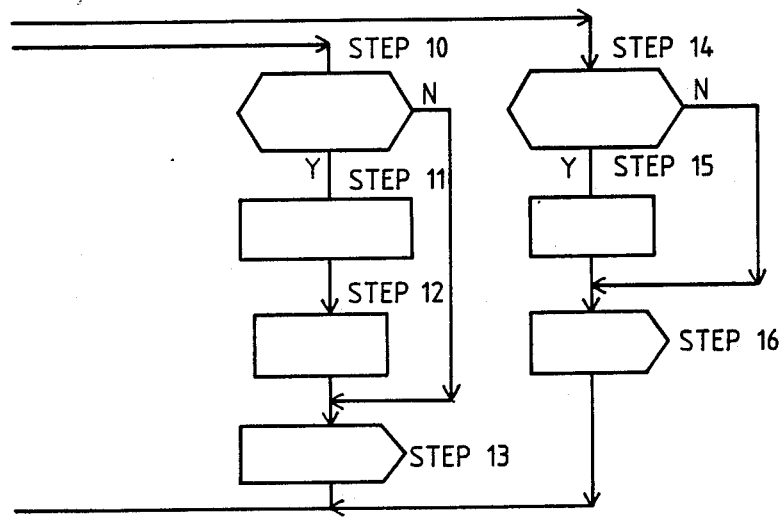

FIGS. 26 and 26a show a Path Check Pattern 1 routine PCP1.

STEP 1. The step causes the Path Check Pattern 1 routine to be entered.

STEP 2. This step determines the data content of Plane 0 and Plane 1 and the action to be taken as follows:

If data D, is available for Plane 0 and Plane 1, step 3 is performed.

If discrepant data, DIS D, is present, step 3 is performed.

If data D is available for Plane 0, and Plane 1 is idle I, step 3 is performed.

If data D is available for Plane 0, and Plane 1 has Path Check 0 PC0 present; step 3 is performed.

If data D is available for Plane 0, and Plane 1 has Path Check 1 PC1 present; step 6 is performed.

If both Plane are idle I,I, step 3 is performed.

If Plane 0 is idle I, and data D is available for Plane 1, step 14 is performed.

If Plane 0 is idle I, and Plane 1 has Path Check 0 PC0 present; step 14 is performed.

If Plane 0 is idle I, and Plane 1 has Path Check 1 PC1 present; step 10 is performed.

STEP 3. This step determines whether the current timeslot number is equal to the timeslot number stored in the speech fault register. If it does not, step 5 is performed. If it does step 4 is performed.

STEP 4. This step sets the peripheral card controller to the state: Looking for Pattern 0.

STEP 5. This step causes Plane 0 data to be sent to the peripheral.

STEP 6. The step determines whether the current timeslot number is equal to the number stored in the speech fault register. If it does not, step 9 is performed. If it does step 7 is performed.

STEP 7. This step causes the fault type in the speech fault register to be set to Continue.

STEP 8. This step sets the peripheral card controller to the state: Path Check Continue.

STEP 9. This step causes Plane 0 data to be sent to the peripheral.

STEP 10. This step determines whether the current timeslot number equals the number stored in the speech fault register. If it does, step 13 is performed. If it does, step 11 is performed.

STEP 11. This step causes the faulty type in the fault register to be set to Continue.

STEP 12. This step sets the peripheral card controller to the state: Path Check Continue.

STEP 13. This step causes Plane 1 data to be sent to the peripheral.

STEP 14. This step determines whether the current timeslot number equals the number stored in the speech fault register. If it does not, step 16 is performed. If it does, step 15 is performed.

STEP 15. This step sets the peripheral card controller to the state: Looking for Pattern 0.

STEP 16. This step causes Plane 1 data to be sent to the peripheral.

STEP 17. This step causes exit from the Path Check Pattern 1 routine.

Figure 27:
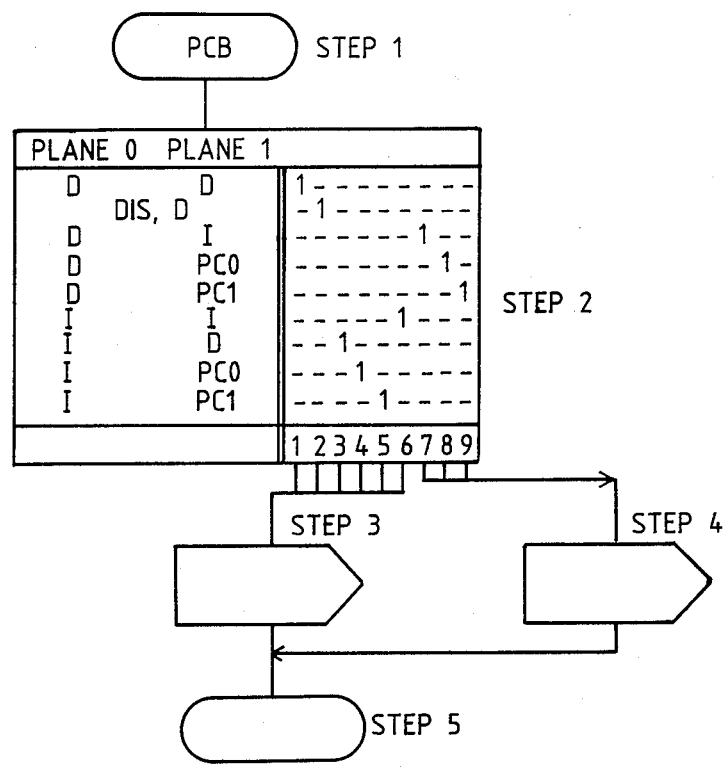

FIG. 27 shows the Path Check Bias routine PCB.

STEP 1. This step causes the Path Check Bias routine to be entered.

STEP 2. This step determines the data content of Plane 0 and Plane 1 and the action to be taken as follows:

If data D, is available for Plane 0 and Plane 1, step 3 is performed.

If discrepant data, DIS D, is present, step 3 is performed.

If data is available for Plane 0, and Plane 1 is idle, step 4 is performed.

If data is available for Plane 0, and Plane 1 has Path Check 0, PC0 present; step 4 is performed.

If data is available for Plane 0, and Plane 1 has Path Check 1, PC1 present; step 4 is performed.

If both planes are idle I,I, step 3 is performed.

If Plane 0 is idle, I and data is available for Plane 1, step 3 is performed.

If Plane 0 is idle I, and Plane 1 has Path Check 0, PC0 present; step 3 is performed.

If Plane 0 is idle I, and Plane 1 has Path Check 1, PC1 present; step 3 is performed.

STEP 3. This step causes Plane 1 data to be sent to the peripheral.

STEP 4. This step causes Plane 0 data to be sent to the peripheral.

STEP 5. This step causes exit from the Path Check Bias routine.

Waveform Distribution

A waveform generator provides three basic clocks to a waveform distributor. The distributor generates all the other waveforms required within the limits of those supplied by the generator.

Timing information is distributed across the control/switch or switch/peripheral boundaries by encoding it into a 2.048Mb/s data stream. Within the functional areas the appropriate timing information can be extracted from the data stream.

Timing from the generator is passed by way of the distributor to a duplicated system comprising the two control/switch planes. Both planes finally drive into a peripheral unit. The common point in the peripheral unit will be the peripheral card controller. The peripheral card controller validates each clock stream received from both planes. If the peripheral card controller decides that both planes have valid clock streams, then it will select one plane arbitrarily. This will mean that different peripherals may be being driven by clocks from different planes. Therefore the clocks provided for each plane by the distributor must be derived from the same generator to ensure phase coherence.

It will be appreciated by those skilled in the art, that the hardware necessary to perform the invention, such as fault registers, counters etc. are types of standard equipment, the function of which is well known in the art.

We claim:

1. In a security telecommunications system having a plurality of peripherals respectively connected to corresponding peripheral card controllers interconnected by switching arrangements, said switching arrangements being respectively duplicated to form two security planes and transmitting data during time slots, a method wherein each of the peripheral card controllers performs the steps of: detecting discrepancies between data transmitted from the switching arrangements under no fault conditions with respect to each of the time slots;

monitoring a path provided between the peripheral card controllers in response to said detection of the discrepancies for appearances of a first test pattern during said time slots; identifying the time slots during which the first test patterns appear on the path; monitoring said path for appearances of a second test pattern in said identified time slots; and detecting the absence of the second test pattern on the monitored path in the identified time slots to signify that one of the security planes is faulty.

2. A security arrangement as claimed in claim 1 wherein the path monitoring steps are performed by the peripheral card controllers transmitting the test patterns to the switching arrangements for all timeslots for which a discrepancy is detected.

3. A security arrangement as claimed in claim 2 wherein each of the peripheral card controllers is arranged to monitor data received from the switching arrangement through which the test patterns are to be returned.

4. A security arrangement as claimed in claim 2, wherein the test patterns are relatively inverse, and are alternated.

5. A security arrangement as claimed in claim 4 wherein the path is a duplex path.

6. A security arrangement as claimed in claim 1 wherein the path monitoring steps is an algorithm which utilizes the condition of the peripheral card controllers as a whole and the condition of each of the identified timeslots.

* * * * *